(12) United States Patent
Fujita et al.

(10) Patent No.: US 11,679,582 B2
(45) Date of Patent: *Jun. 20, 2023

(54) SHEET PROCESSING DEVICE, LAMINATING DEVICE, IMAGE FORMING APPARATUS, AND IMAGE FORMING SYSTEM

(71) Applicants: Suzuka Fujita, Kanagawa (JP); Tomohiro Furuhashi, Kanagawa (JP); Wataru Takahashi, Tokyo (JP); Yoshito Suzuki, Chiba (JP); Shinya Monma, Kanagawa (JP); Joji Akiyama, Kanagawa (JP); Yohsuke Haraguchi, Kanagawa (JP); Sho Asano, Kanagawa (JP); Wataru Nozaki, Kanagawa (JP)

(72) Inventors: Suzuka Fujita, Kanagawa (JP); Tomohiro Furuhashi, Kanagawa (JP); Wataru Takahashi, Tokyo (JP); Yoshito Suzuki, Chiba (JP); Shinya Monma, Kanagawa (JP); Joji Akiyama, Kanagawa (JP); Yohsuke Haraguchi, Kanagawa (JP); Sho Asano, Kanagawa (JP); Wataru Nozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,968

(22) Filed: Dec. 23, 2021

(65) Prior Publication Data

US 2022/0291620 A1 Sep. 15, 2022

(30) Foreign Application Priority Data

Mar. 12, 2021 (JP) ................................. 2021-040084

(51) Int. Cl.
*B32B 38/18* (2006.01)
*B32B 37/00* (2006.01)

(52) U.S. Cl.
CPC ...... *B32B 38/1833* (2013.01); *B32B 37/0053* (2013.01); *B32B 37/0076* (2013.01);
(Continued)

(58) Field of Classification Search
CPC ...... B65H 5/34; B65H 29/68; B65H 2513/10; B65H 29/6618; B65H 29/683;
(Continued)

(56) References Cited

U.S. PATENT DOCUMENTS 5,217,561 A * 6/1993 Ueda ................... B32B 38/0036
219/508
6,893,521 B2 * 5/2005 Sasaki ................... B32B 37/185
156/367

(Continued)

FOREIGN PATENT DOCUMENTS

JP 7-002418 1/1995
JP 9-164593 6/1997

(Continued)

*Primary Examiner* — Francisco W Tschen
*Assistant Examiner* — Abhishek A Patwardhan
(74) *Attorney, Agent, or Firm* — Harness, Dickey & Pierce, P.L.C

(57) ABSTRACT

A sheet processing device includes a conveyor, a rotator, a separator, and control circuitry. The conveyor conveys a sheet-shaped medium into a two-ply sheet in which two sheets are overlaid and partially bonded, and includes a drive roller and a driven roller. The rotator winds the two-ply sheet. The separator separates the two sheets of the two-ply sheet. The control circuitry causes the conveyor to convey the two-ply sheet in a winding direction to wind the two-ply sheet around the rotator to generate a space between the two sheets, and causes the separator to insert into the space between the two sheets to separate the two sheets. The drive (Continued)

roller and the rotator are disposed on a same side with respect to a sheet conveyance passage of the two-ply sheet, and the driven roller and the rotator are disposed on opposite sides with respect to the sheet conveyance passage.

15 Claims, 14 Drawing Sheets

(52) U.S. Cl.
CPC .......... *B32B 2037/0061* (2013.01); *B32B 2037/0069* (2013.01); *B32B 2309/70* (2013.01)

(58) Field of Classification Search
CPC ............ B65H 29/686; B32B 38/1833; B32B 37/0053; B32B 37/0076; B32B 2037/0061; B32B 2037/0069; B32B 2309/70
USPC ................................ 156/383; 271/202, 270
See application file for complete search history.

(56) References Cited

U.S. PATENT DOCUMENTS

| | | | |
|---|---|---|---|
| 7,946,326 B2 * | 5/2011 | Lee | B65H 5/305 156/367 |
| 2004/0033095 A1 * | 2/2004 | Saffari | G07F 17/3202 400/120.01 |
| 2005/0079968 A1 * | 4/2005 | Trovinger | B65H 45/142 493/356 |
| 2009/0039593 A1 | 2/2009 | Kikkawa et al. | |
| 2011/0103921 A1 | 5/2011 | Suzuki et al. | |
| 2011/0248440 A1 * | 10/2011 | Sugiyama | G03G 15/6552 271/272 |
| 2012/0267846 A1 | 10/2012 | Nakada et al. | |
| 2015/0031520 A1 | 1/2015 | Nakada et al. | |
| 2016/0257100 A1 * | 9/2016 | Tachibana | B32B 37/0053 |
| 2016/0340145 A1 | 11/2016 | Kunieda et al. | |
| 2017/0021603 A1 * | 1/2017 | Kikuchi | B32B 37/182 |
| 2019/0284012 A1 | 9/2019 | Yoneyama et al. | |
| 2020/0247107 A1 | 8/2020 | Morinaga et al. | |
| 2020/0247636 A1 | 8/2020 | Furuhashi et al. | |
| 2020/0341414 A1 | 10/2020 | Watanabe et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |
| 2021/0253385 A1 | 8/2021 | Yoshito et al. | |
| 2021/0289090 A1 | 9/2021 | Monma et al. | |
| 2021/0294249 A1 | 9/2021 | Takahashi et al. | |
| 2021/0325804 A1 | 10/2021 | Furuhashi et al. | |
| 2021/0333730 A1 | 10/2021 | Asano et al. | |
| 2021/0347160 A1 | 11/2021 | Akiyama et al. | |
| 2021/0347589 A1 | 11/2021 | Suzuki et al. | |
| 2021/0354948 A1 | 11/2021 | Takahashi et al. | |
| 2021/0356899 A1 | 11/2021 | Takahashi et al. | |

FOREIGN PATENT DOCUMENTS

| | | |
|---|---|---|
| JP | 2006-160429 | 6/2006 |
| JP | 2020-121868 | 8/2020 |
| JP | 2020-121869 | 8/2020 |

* cited by examiner

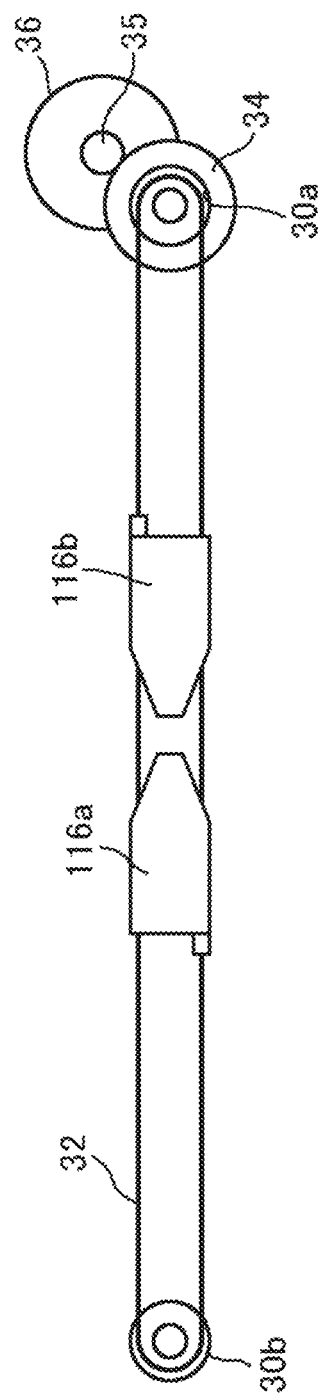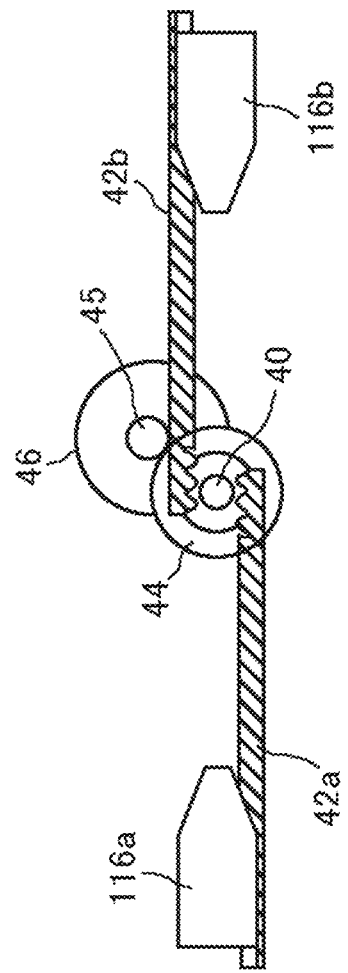

| FIG. 28A |
| FIG. 28B |
| FIG. 28C |

SHEET PROCESSING DEVICE, LAMINATING DEVICE, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-040084, filed on Mar. 12, 2021, in the Japan Patent Office, the entire disclosure of which is incorporated by reference herein.

BACKGROUND

Technical Field

Embodiments of the present disclosure relate to a sheet processing device, a laminating device, an image forming apparatus, and an image forming system.

Related Art

Lamination technologies have been proposed that insert an inner sheet (e.g., paper or photo) between a two-ply sheet or lamination film (e.g., a lamination pouch or lamination folder) and apply heat and pressure to the two-ply sheet to bond the two-ply sheet. The two-ply sheet is made of two sheets (plies) bonded (sealed) on one side as if one sheet is folded.

SUMMARY

In an embodiment of the present disclosure, there is provided a sheet processing device that includes a conveyor, a rotator, a separator, and control circuitry. The conveyor conveys a sheet-shaped medium into a two-ply sheet in which two sheets are overlaid and partially bonded, and includes a drive roller to drive rotationally and a driven roller to be driven by the drive roller. The rotator winds the two-ply sheet. The separator separates the two sheets of the two-ply sheet. The control circuitry causes the conveyor to convey the two-ply sheet in a winding direction to wind the two-ply sheet around the rotator to generate a space between the two sheets of the two-ply sheet, and causes the separator to insert into the space between the two sheets of the two-ply sheet to separate the two sheets of the two-ply sheet. The drive roller and the rotator are disposed on a same side with respect to a sheet conveyance passage of the two-ply sheet, and the driven roller and the rotator are disposed on opposite sides with respect to the sheet conveyance passage.

In another embodiment of the present disclosure, there is provided a laminating device that includes the sheet processing device and a heat pressing member to heat and press the two-ply sheet.

In still another embodiment of the present disclosure, there is provided an image forming apparatus that includes an image forming device to form an image and one of the sheet processing device and the laminating device.

In still yet another embodiment of the present disclosure, there is provided an image forming system that includes an image forming apparatus and one of the sheet processing device and the laminating device. The one of the sheet processing device and the laminating device is detachably attached to the image forming apparatus.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 14A is a diagram illustrating a drive configuration, as an example, of the separation claws illustrated in FIG. 13;

FIG. 14B is a diagram illustrating a drive configuration, as another example, of the separation claws illustrated in FIG. 13;

Figure 1:
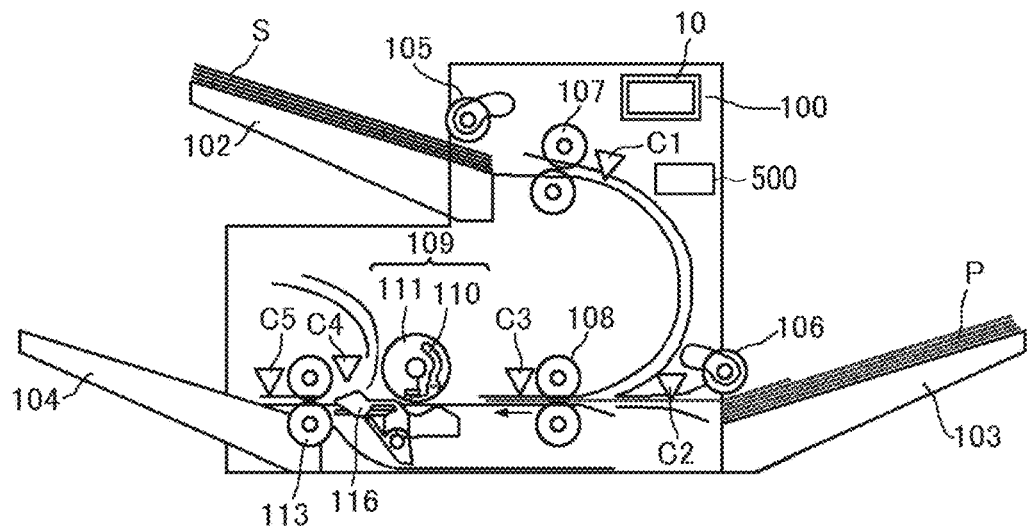
FIG. 1 is a schematic diagram illustrating a general arrangement of a sheet processing device according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. As used herein, the singular forms "a," "an," and "the" are intended to include the plural forms as well, unless the context clearly indicates otherwise. In the drawings for explaining the following embodiments, the same reference codes are allocated to elements (members or components) having the same function or shape and redundant descriptions thereof are omitted below.

FIG. 1 is a schematic diagram illustrating a general arrangement of a sheet processing device 100 according to one embodiment of the present disclosure. The sheet processing device 100 according to the present embodiment separates two sheets (plies) of a two-ply sheet (hereinafter referred to as a lamination sheet S) to insert and sandwich a sheet-shaped medium (hereinafter referred to as an inner sheet P) between the separated sheets of the lamination sheet S.

The lamination sheet S is the two-ply sheet in which two sheets are overlapped and bonded together at a portion (or a side) of the two-ply sheet. For example, there is a two-ply sheet in which a first side as a transparent sheet such as a transparent polyester sheet and a second side facing the first side as a transparent or opaque sheet are bonded at one side of the two-ply sheet. Examples of the two-ply sheet also include a lamination film.

The inner sheet P is an example of the sheet-shaped medium that is inserted into the two-ply sheet. The sheet-shaped medium may be, for example, thick paper, a postcard, an envelope, plain paper, thin paper, coated paper, art paper, tracing paper, and an overhead projector (OHP) transparency.

As illustrated in FIG. 1, the sheet processing device 100 includes a sheet tray 102, a pickup roller 105, and a conveying roller pair 107. The sheet tray 102 functions as a first loader on which the lamination sheets S are loaded. The pickup roller 105 feeds the lamination sheet S from the sheet tray 102. The sheet processing device 100 further includes a sheet feed tray 103 as a second loader on which the inner sheet P is loaded, and a pickup roller 106 that feeds the inner sheet P from the sheet feed tray 103.

A conveyance sensor C1 is disposed downstream from the conveying roller pair 107 in the sheet conveyance direction to detect a sheet conveyance position of the lamination sheet S. A conveyance sensor C2 is disposed downstream from the pickup roller 106 in the sheet conveyance direction to detect the sheet conveyance position of the inner sheet P. Note that the sheet conveyance position of the lamination sheet S is a position of the lamination sheet S conveyed. Similarly, the sheet conveyance position of the inner sheet P is a position of the inner sheet P conveyed.

The sheet processing device 100 includes an entrance roller pair 108 as a first conveyor, a winding roller 109 as a rotator, an exit roller pair 113 as a second conveyor, and a sheet ejection tray 104. The entrance roller pair 108, the winding roller 109, the exit roller pair 113, and the sheet ejection tray 104 are disposed downstream from the conveying roller pair 107 and the pickup roller 106 in the sheet conveyance direction. The sheet processing device 100 further includes a separation claw 116 as a separator between the winding roller 109 and the exit roller pair 113. The separation claw 116 is movable in a width direction of the lamination sheet S.

A conveyance sensor C3 that detects the sheet conveyance positions of the lamination sheet S and the inner sheet P is disposed downstream from the entrance roller pair 108 in the sheet conveyance direction. An abnormality detection sensor C4 that detects the condition of the lamination sheet S is disposed downstream from the winding roller 109 in the sheet conveyance direction. A conveyance sensor C5 that detects the sheet conveyance position of the lamination sheet S is disposed downstream from the exit roller pair 113 in the sheet conveyance direction.

The pickup roller 105, the conveying roller pair 107, the entrance roller pair 108, and the winding roller 109 are examples of a first feeder. The pickup roller 106, the entrance roller pair 108, and the winding roller 109 are examples of a second feeder.

An operation panel 10 is disposed on an exterior of the sheet processing device 100. The operation panel 10 serves as a display-operation device to display data of the sheet processing device 100 and receives input of the operation of the sheet processing device 100. The operation panel 10 also serves as a notification device to output a perceptual signal to a user. Note that, as an alternative, a notification device other than the operation panel 10 may be separately disposed in the sheet processing device 100.

The sheet processing device 100 according to the present embodiment loads the lamination sheets S and the inner sheets P on separate trays. As the lamination sheet S is conveyed in the sheet processing device 100, the sheet processing device 100 separates and opens the lamination sheet S into two sheets and inserts the inner sheet P into an opening of the lamination sheet S. The exit roller pair 113 ejects the lamination sheet S, in which the inner sheet P has been inserted, onto the sheet ejection tray 104. Thus, the lamination sheets S lie stacked on the sheet ejection tray 104.

Figure 2:
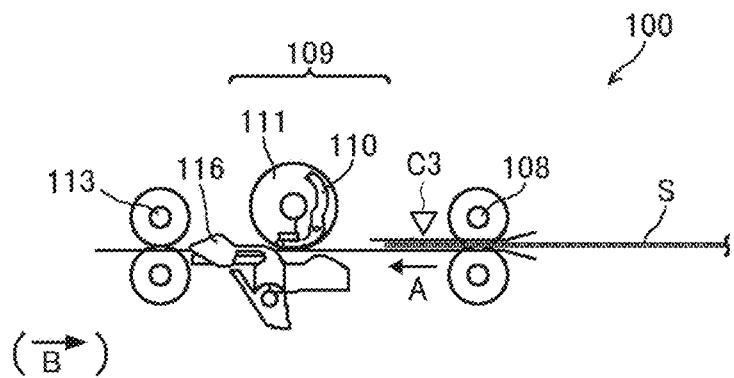
FIG. 2 is a schematic view of a main part of the sheet processing device of FIG. 1.

FIG. 2 is a schematic view of a main part of the sheet processing device of FIG. 1. As illustrated in FIG. 2, each of the entrance roller pair 108 and the exit roller pair 113 is two rollers paired with each other and driven to rotate by a driver such as a motor. The entrance roller pair 108 rotates in one direction. The exit roller pair 113 rotates in forward and reverse directions, thereby nipping and conveying the lamination sheet S and the inner sheet P together with the entrance roller pair 108.

The entrance roller pair 108 conveys the lamination sheet S and the inner sheet P toward the exit roller pair 113. The sheet conveyance direction indicated by arrow A in FIG. 2 is referred to as a forward conveyance direction or a direction A.

On the other hand, the exit roller pair 113 is capable of switching the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (i.e., the direction opposite the forward conveyance direction) indicated by arrow B in FIG. 2 is hereinafter referred to as a reverse conveyance direction or a direction B.

The sheet processing device 100 further includes the winding roller 109 as a rotator and the separation claw 116 between the entrance roller pair 108 and the exit roller pair 113. The winding roller 109 is driven by the driver such as a motor to rotate in the forward and reverse directions. The direction of rotation of the winding roller 109 is switchable between the forward direction (i.e., clockwise direction) and the reverse direction (i.e., counterclockwise direction).

The winding roller 109 includes a roller 111 and a movable gripper 110 disposed on the roller 111 to grip the lamination sheet S. The gripper 110 that is movable grips the leading end of the lamination sheet S in the forward conveyance direction, together with the roller 111. The gripper 110 may be integrated with the outer circumference of the roller 111 or may be a separate component.

Next, a description is given of a series of operations performed in the sheet processing device 100, with reference to FIGS. 1 to 12B. The series of operations performed by the sheet processing device 100 indicates the operations from separating the lamination sheet S to inserting the inner sheet P into the lamination sheet S. In FIGS. 3 to 12B, elements identical to those illustrated in FIG. 1 or 2 are given identical reference numerals, and redundant descriptions thereof are omitted.

In FIG. 1, the lamination sheet S is loaded on the sheet tray 102 such that the bonded side of the two sheets is located downstream from the pickup roller 105 in a direction in which the pickup roller 105 feeds the lamination sheet S (i.e., the sheet conveyance direction). In the sheet processing device 100, the pickup roller 105 picks up the lamination sheet S from the sheet tray 102, and the conveying roller pair 107 conveys the lamination sheet S toward the entrance roller pair 108.

Next, as illustrated in FIG. 2, the entrance roller pair 108 conveys the lamination sheet S toward the winding roller 109. In the sheet processing device 100, the entrance roller pair 108 conveys the lamination sheet S with the bonded end, which is one of four sides of the lamination sheet S, as a downstream side in the forward conveyance direction (i.e., the direction A).

Figure 3:
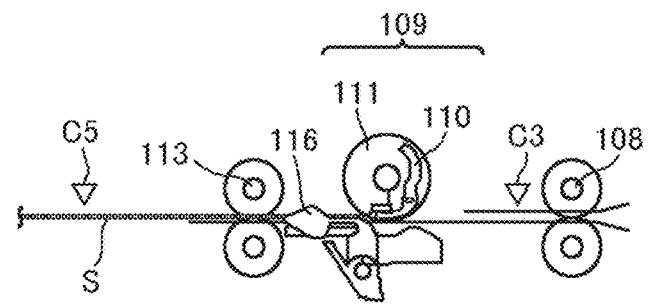
FIG. 3 is a view of the main part of the sheet processing device temporarily stopping sheet conveyance, subsequent to the state in FIG. 2.

Subsequently, as illustrated in FIG. 3, a controller 500 of the sheet processing device 100 temporarily stops conveyance of the lamination sheet S when the trailing end of the lamination sheet S in the forward conveyance direction has passed the winding roller 109. Note that these operations are performed by conveying the lamination sheet S from the conveyance sensor C3 by a designated amount in response to the conveyance sensor C3 detecting the leading end of the lamination sheet S.

Figure 4:
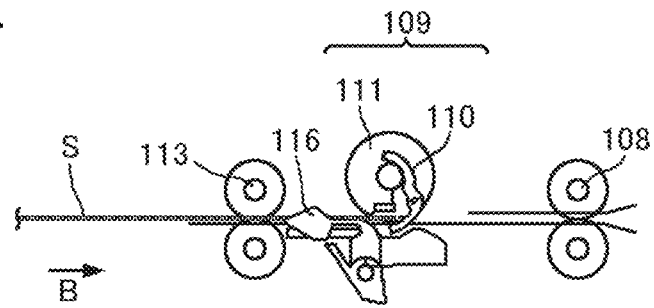
FIG. 4 is a view of the main part of the sheet processing device conveying a lamination sheet, subsequent to the state in FIG. 3.

Next, as illustrated in FIG. 4, the controller 500 of the sheet processing device 100 causes the gripper 110 to open and the exit roller pair 113 to rotate in the reverse direction to convey the lamination sheet S in the reverse conveyance direction (i.e., the direction indicated by arrow B in FIG. 4) toward the opened portion of the gripper 110.

Figure 5:
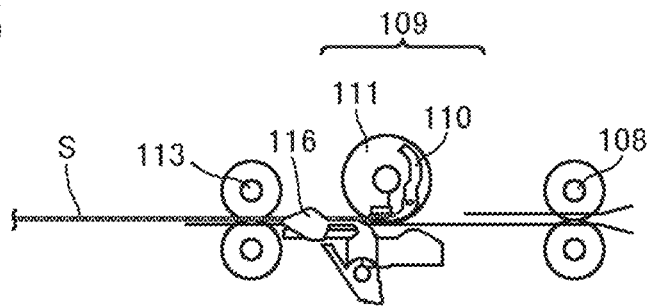
FIG. 5 is a view of the main part of the sheet processing device in a state subsequent to the state in FIG. 4.

Subsequently, as illustrated in FIG. 5, the controller 500 of the sheet processing device 100 causes the exit roller pair 113 to suspend conveyance of the lamination sheet S when the end of the lamination sheet S is inserted into the opened portion of the gripper 110, and closes the gripper 110 to grip the end of the lamination sheet S. Note that these operations are performed when the lamination sheet S is conveyed by the designated amount.

Figure 6:
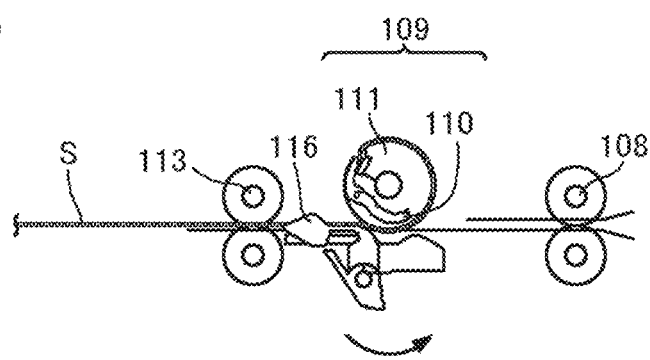
FIG. 6 is a view of the main part of the sheet processing device in which a winding roller rotates in reverse to wind the lamination sheet around the winding roller, subsequent to the state in FIG. 5.

Then, as illustrated in FIG. 6, the controller 500 of the sheet processing device 100 causes the winding roller 109 to rotate in the counterclockwise direction in FIG. 6 so as to wind the lamination sheet S around the winding roller 109. The lamination sheet S is wound around the winding roller 109 from a side where the two sheets of the lamination sheet S are overlapped but not bonded.

Figure 7:
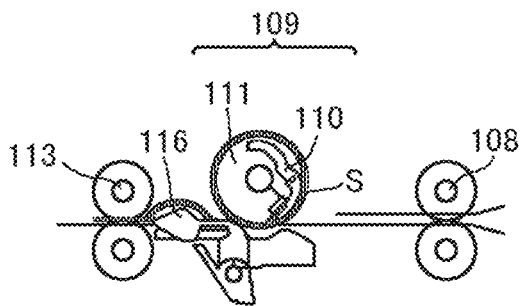
FIG. 7 is a view of the main part of the sheet processing device in which separation claws are inserted into a space between two sheets of the lamination sheet, subsequent to the state in FIG. 6.

As illustrated in FIG. 7, when the lamination sheet S as a two-ply sheet is wound around the winding roller 109, a winding circumferential length difference is generated between the two sheets in the amount of winding of the lamination sheet S around the circumference of the winding roller 109. The winding circumferential length difference causes a surplus of an inner circumferential sheet that is closer to the center of the winding roller 109 than an outer circumferential sheet of the two-ply sheet. As a result, the inner circumferential sheet is loosed toward the bonded end. As a result, a space is formed between the two sheets constructing the two-ply sheet. As the separation claws 116 are inserted into the space formed as described above, from opposed sides of the lamination sheet S, the space between the two sheets is reliably maintained. When the conveyance sensor C5 detects the leading end of the lamination sheet S, the controller 500 of the sheet processing device 100 receives a trigger signal from the conveyance sensor C5. The controller 500 of the sheet processing device 100 causes the exit roller pair 113 to convey the lamination sheet S by a designated amount from the conveyance sensor C5.

Here, a description is further given of the separation claw 116.

Figure 13:
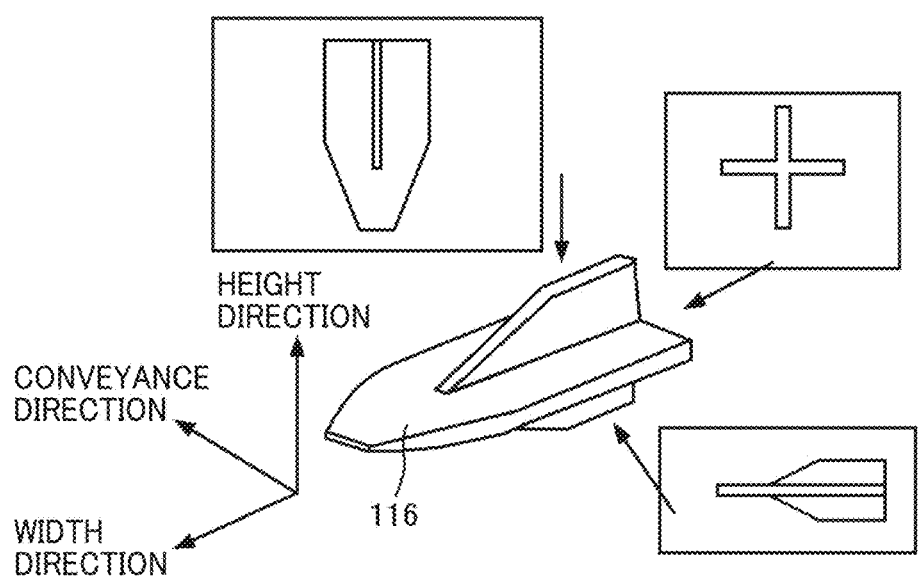
FIG. 13 is a schematic view of one of separation claws of the sheet processing device illustrated in FIG. 1.
Figure 15:
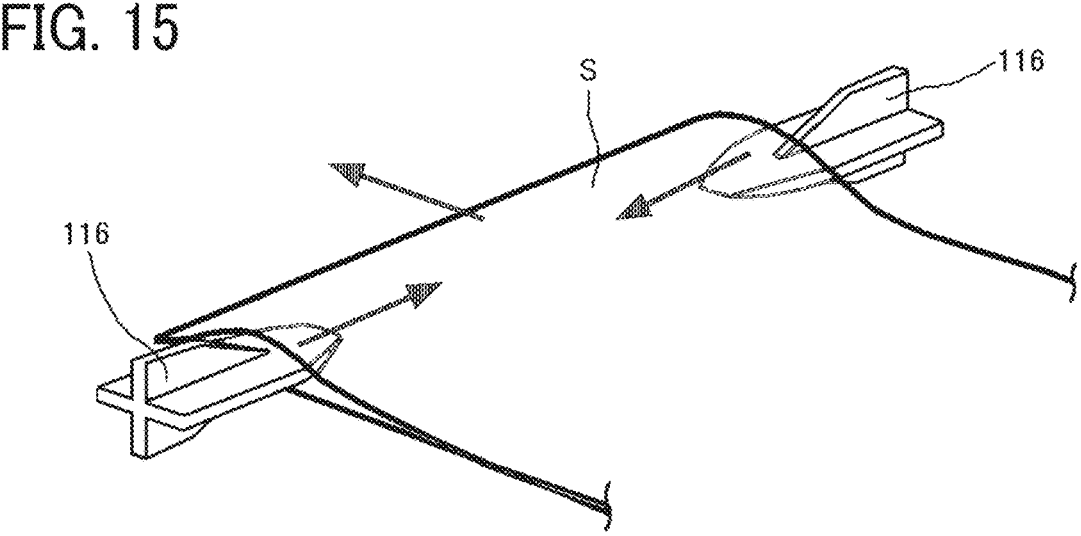
FIG. 15 is a perspective view of the separation claws inserted into the lamination sheet.

FIG. 13 is a schematic view of the separation claw 116 of the sheet processing device 100. FIG. 14A is a diagram illustrating a drive configuration, as an example, of the separation claws 116. FIG. 14B is a diagram illustrating a drive configuration, as another example, of the separation claws 116. FIG. 15 is a perspective view of the separation claws 116 inserted in the lamination sheet S.

As illustrated in FIG. 13, when viewed in the sheet conveyance direction, the size in the height (i.e., in the vertical direction) of the separation claw 116 gradually increases from the center in a width direction of the separation claws 116 to the trailing end (i.e., the right end in FIG. 13). Further, when viewed in the vertical direction, the size of the separation claw 116 in the sheet conveyance direction gradually increases from the leading end to the center. When viewed in the width direction of the separation claws 116, the separation claw 116 has a cross shape.

Further, in the present embodiment, referring to FIGS. 14A and 14B, the two separation claws 116 are disposed facing each other and moved in an approaching direction and a separating direction, for example, by a belt drive mechanism as illustrated in FIG. 14A or by a rack and pinion mechanism illustrated in FIG. 14B.

Specifically, the belt drive mechanism illustrated in FIG. 14A includes a belt 32 stretched between a drive pulley 30a and a driven pulley 30b and two separation claws 116a and 116b attached to the belt 32 so as to face each other. The separation claw 116a is coupled to the lower side of the belt 32, and the other separation claw 116b is coupled to the upper side of the belt 32.

The drive pulley 30a is provided with a drive transmission gear 34. The rotation output from a drive motor 36 is transmitted to the drive transmission gear 34 via a motor output gear 35. That is, the rotation output from the drive motor 36 is transmitted to the belt 32.

Accordingly, as the drive motor 36 rotates clockwise in FIG. 14A, the separation claws 116a and 116b are moved close to each other. As the drive motor 36 rotates counterclockwise in FIG. 14A, the separation claws 116a and 116b are separated from each other.

The rack and pinion mechanism illustrated in FIG. 14B includes two racks 42a and 42b meshing with a pinion 40 so as to extend in opposite directions and the two separation claws 116a and 116b attached to the racks 42a and 42b, respectively, to face each other. The pinion 40 is provided with a drive transmission gear 44. The rotation output from a drive motor 46 is transmitted to the drive transmission gear 44 via a motor output gear 45. That is, the rotation output from the drive motor 46 is transmitted to each of the racks 42a and 42b.

Accordingly, as the drive motor 46 rotates clockwise in FIG. 14B, the separation claws 116a and 116b are moved close to each other. As the drive motor 46 rotates counterclockwise in FIG. 14B, the separation claws 116a and 116b are separated from each other.

As described above, the separation claws 116 in the present embodiment having the above-described shape are movable in the width direction of the lamination sheet S. Accordingly, the separation claws 116 can be smoothly inserted into the space formed in the lamination sheet S as illustrated in FIG. 15.

Figure 8:
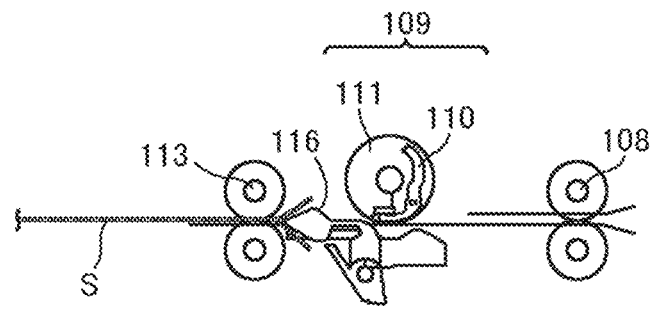
FIG. 8 is a view of the main part of the sheet processing device in which the winding roller rotates in a forward direction so as to move the space in the lamination sheet and the separation claws to the rear end of the lamination sheet, subsequent to the state in FIG. 7.

A description of the series of operations of the sheet processing device 100 is continued below. With the separation claws 116 inserted in the space in the lamination sheet S, the controller 500 of the sheet processing device 100 causes the winding roller 109 to rotate in the clockwise direction (see FIG. 7) and move the space formed in the lamination sheet S to the trailing end of the lamination sheet S in the forward conveyance direction (i.e., the direction A, see FIG. 2), as illustrated in FIG. 8. After the winding roller 109 has been rotated by a designated amount, the controller 500 of the sheet processing device 100 causes the gripper 110 to open. As a result, the lamination sheet S is separated into the upper and lower sheets at the trailing end.

In this state, the controller 500 of the sheet processing device 100 causes the exit roller pair 113 to stop the conveyance of the lamination sheet S temporarily, and causes the separation claws 116 to move in the width direction of the lamination sheet S so as to separate the whole area of the trailing end of the lamination sheet S. When the conveyance sensor C5 detects the leading end of the lamination sheet S, the controller 500 of the sheet processing device 100 receives a trigger signal from the conveyance sensor C5. The controller 500 of the sheet processing device 100 causes the exit roller pair 113 to convey the lamination sheet S by a designated amount from the conveyance sensor C5.

Figure 16:
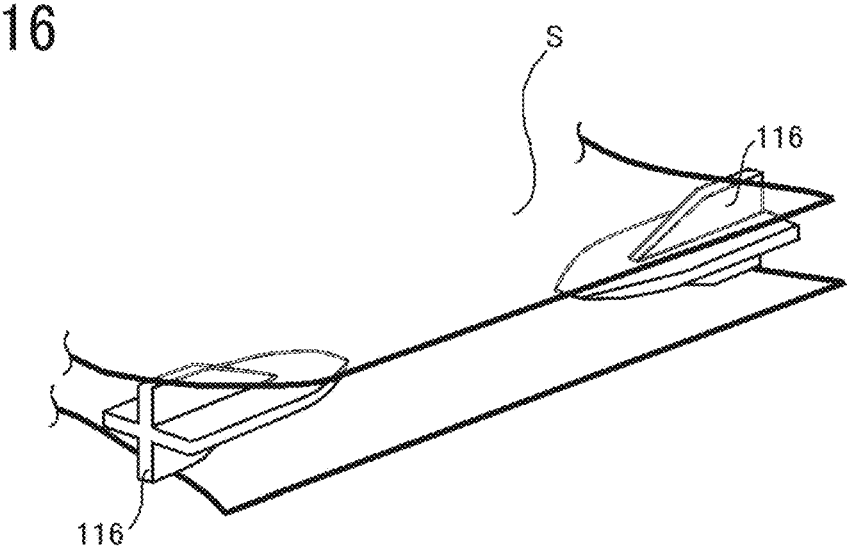
FIG. 16 is a perspective view of the separation claws and the lamination sheet in the state illustrated in FIG. 8.

FIG. 16 is a perspective view of the separation claws 116 and the lamination sheet S in the state illustrated in FIG. 8. Since each of the separation claws 116 functions as a branching claw that guides the two separated sheets of the lamination sheet S in different directions due to the above-described shape (see FIG. 13), the two separated sheets of the lamination sheet S may be kept in postures to be conveyed to different sheet conveyance passages.

Figure 17:
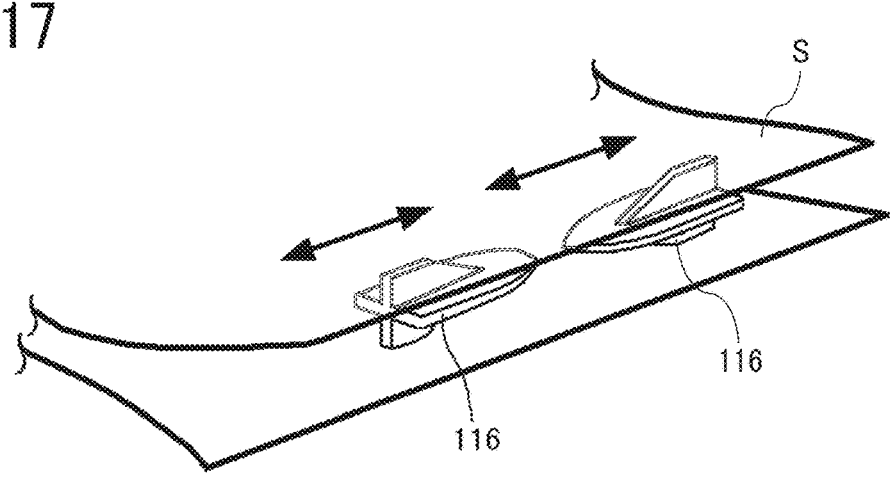
FIG. 17 is another perspective view of the separation claws and the lamination sheet in the state illustrated in FIG. 8.

Further, since the separation claws 116 are movable in the width direction of the lamination sheet S (see FIGS. 14A and 14B), the separation claws 116 are positioned suitably to support the postures of the two sheets of the lamination sheet S as illustrated in FIG. 17. Therefore, even when the size of the lamination sheet S and the rigidity (or retentivity corresponding to the propensity to retain a particular shape once applied, such as curvature of paper) of the lamination sheet S change, the two separated sheets of the lamination sheet S are guided in desired branching directions. This configuration eliminates the need for a lamination sheet branching member over the whole area in a width direction of a sheet conveyance passage and a driver to drive the branching claw, thereby reducing the cost when compared with the configuration of a known sheet processing device.

Figure 9:
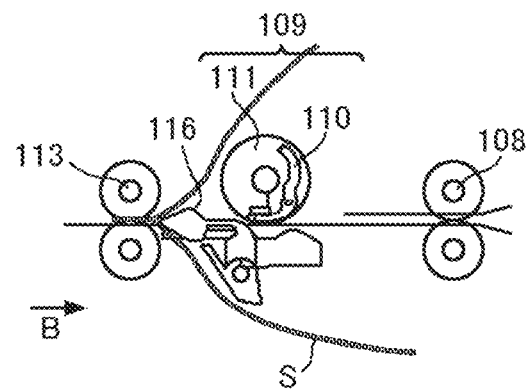
FIG. 9 is a view of the main part of the sheet processing device conveying the lamination sheet in reverse with ends of the two sheets separated, subsequent to the state in FIG. 8.

Next, as illustrated in FIG. 9, after the separation claws 116 have separated the whole area of the trailing end of the lamination sheet S, the controller 500 of the sheet processing device 100 causes the exit roller pair 113 to rotate in the counterclockwise direction in FIG. 9 so as to convey the lamination sheet S in the reverse conveyance direction (i.e., the direction B). In other words, the separation claws 116 guide the two separated sheets of the lamination sheet S in the upper and lower directions and thus the two sheets are fully separated.

Then, the controller 500 of the sheet processing device 100 causes exit roller pair 113 to stop the conveyance of the lamination sheet S temporarily, so that the bonded portion of the lamination sheet S is held (nipped) by the exit roller pair 113. Accordingly, one end of the lamination sheet S is bonded as the bonded side of the lamination sheet S and the other end of the lamination sheet S is open widely.

When the conveyance sensor C5 detects the leading end of the lamination sheet S, the controller 500 of the sheet processing device 100 receives a trigger signal from the conveyance sensor C5. The controller 500 of the sheet processing device 100 causes the exit roller pair 113 to convey the lamination sheet S by a designated amount from the conveyance sensor C5.

Next, problems that are solved by the embodiments of the present disclosure is described below.

As described above with reference to FIG. 7, when the lamination sheet S as a two-ply sheet is wound around the winding roller 109, a winding circumferential length difference is generated between the two sheets in the amount of winding of the lamination sheet S around the circumference of the winding roller 109. The winding circumferential length difference causes a surplus of the inner circumferential sheet of the two-ply sheet. As a result, a space is formed between the two sheets constructing the two-ply sheet. However, the height of the space (or a loosed amount of the inner circumferential sheet) decreases in a case where the sheets are strongly stuck together or depending on the type (e.g., material) of sheet. Such a decreased height of the space hampers insertion of the separation claw 116 into the space and separation of the two sheets of the lamination sheet S.

To address such a situation, the inventors have examined the behavior of the lamination sheet S during conveyance in order to further slacken the inner circumferential sheet.

Figure 18:
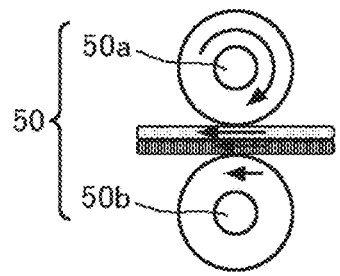
FIG. 18 is a schematic diagram illustrating the behavior of the two-ply sheet conveyed by a conveying roller pair.
Figure 19:
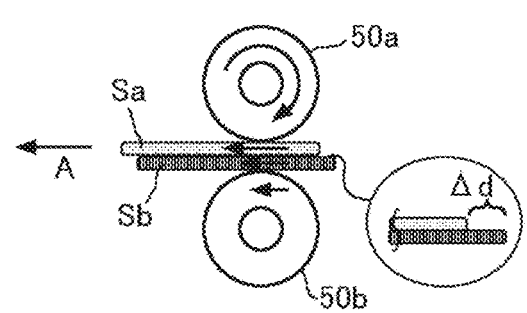
FIG. 19 is another schematic diagram illustrating the behavior of the two-ply sheet conveyed by the conveying roller pair.

FIGS. 18 and 19 are schematic diagrams illustrating the behavior of the two-ply sheet conveyed by a pair of conveying rollers. As illustrated in FIG. 18, a conveying roller pair 50 includes two rollers facing each other. One of the two rollers is a drive roller 50a that is rotationally driven by a motor. The other one of the two rollers is a driven roller 50b that is rotationally driven in contact with the drive roller 50a.

When the two-ply sheet is conveyed by the conveying roller pair 50, as illustrated in FIG. 19, a sheet Sa in contact with the drive roller 50a is conveyed by a rotational force (i.e., a conveying force) of the drive roller 50a in a direction indicated by arrow A. On the other hand, a sheet Sb in contact with the driven roller 50b is conveyed in the direction indicated by arrow A by a frictional force generated between the sheet Sa and the sheet Sb. Then, the driven roller 50b is rotationally driven by a frictional force generated between the sheet Sb and the driven roller 50b.

Since the sheet Sb in contact with the driven roller 50b and the driven roller 50b are not in direct contact with the drive roller 50a, the slippage of the sheet Sb is higher than the slippage of the sheet Sa in contact with the drive roller 50a. That is, the conveying force acting on the sheet Sb in contact with the driven roller 50b is smaller than the conveying force acting on the sheet Sa in contact with the drive roller 50a.

Such a difference in the slippage or the conveying force generates a difference in the amount of conveyance between the sheet Sa and sheet Sb. As a result, as illustrated in the partially enlarged view of FIG. 19, a deviation (Δd) is generated at the respective trailing ends of the two sheets in the direction indicated by arrow A.

This "deviation" in addition to the winding circumferential length difference (i.e., difference in winding amount) between the two sheets of the two-ply sheet increases the surplus of the sheet Sa as an inner circumferential sheet of the two-ply sheet. As a result, the space that is formed by winding the lamination sheet S is enlarged. In the embodiments of the present disclosure, this behavior (phenomenon) is utilized to generate the deviation between the two sheets of the two-ply sheet and wind the two-ply sheet around the winding roller 109.

Figure 20:
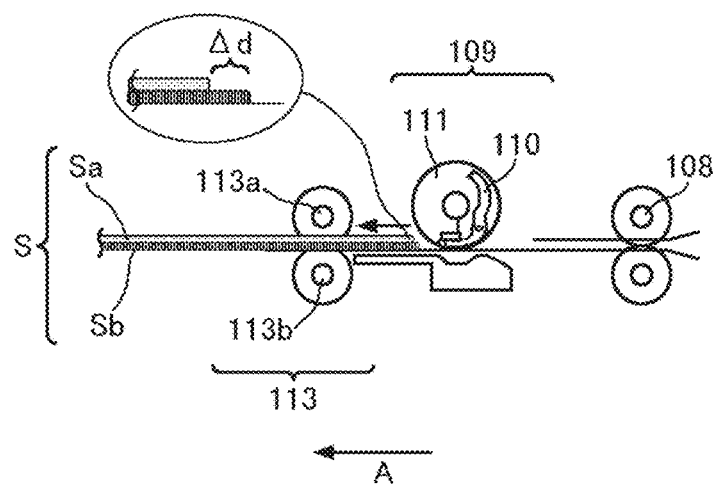
FIG. 20 is a view of the main part of the sheet processing device in which a deviation is generated in the two-ply sheet conveyed by the conveying roller pair, subsequent to the state in FIG. 12.
Figure 21:
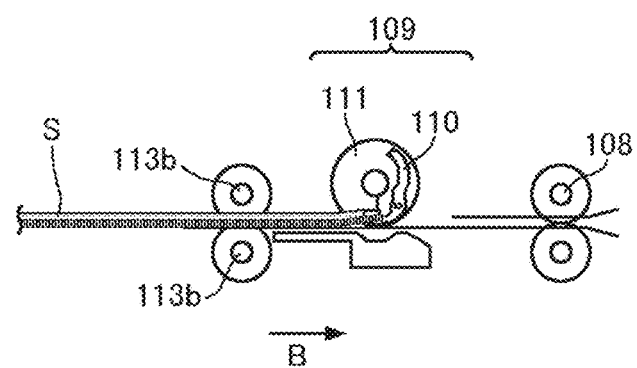
FIG. 21 is a view of the main part of the sheet processing device in which the two-ply sheet is gripped by the winding roller, subsequent to the state in FIG. 20.
Figure 22:
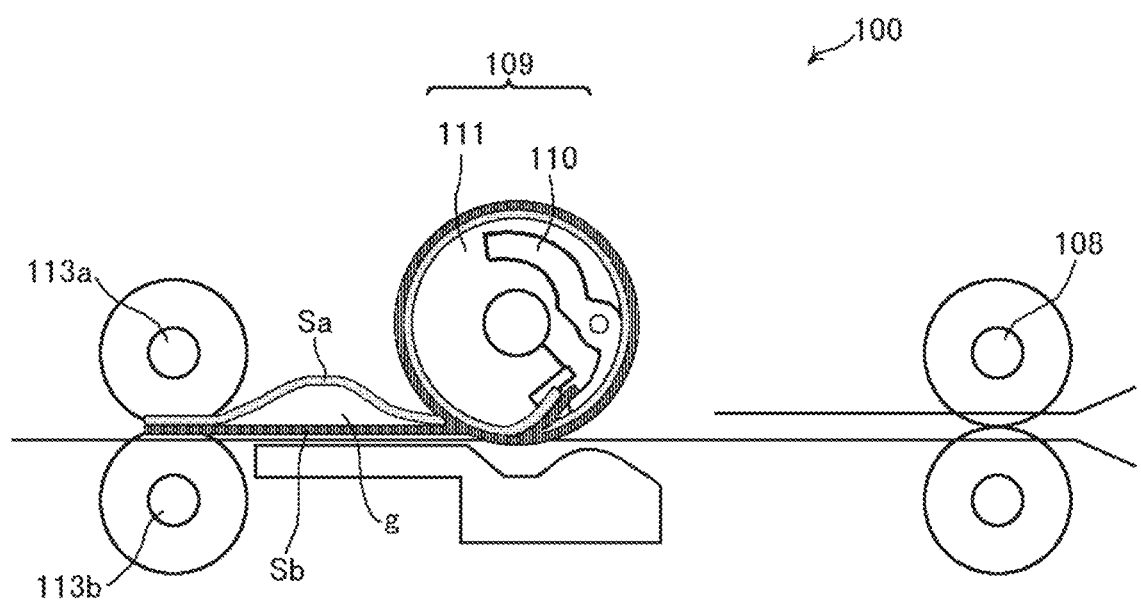
FIG. 22 is a view of the main part of the sheet processing device in which the two-ply sheet is wound around the winding roller, subsequent to the state in FIG. 21.

A description is given of the winding operation of the lamination sheet S, as a feature of the present embodiment with reference to FIGS. 20 to 22.

FIG. 20 is a schematic view of the main part of the sheet processing device 100. As illustrated in FIG. 20, the exit roller pair 113 as a conveying roller is a roller pair including a drive roller 113a and a driven roller 113b that contacts the drive roller 113a and is rotationally driven by the drive roller 113a. The drive roller 113a and the winding roller 109 are disposed on the same side of the sheet conveyance passage of the lamination sheet S. The driven roller 113b is on the opposite side of the sheet conveyance passage.

When the lamination sheet S is conveyed by the exit roller pair 113 in the direction A, the two sheets of the lamination sheet S are conveyed in the same direction. As illustrated in FIG. 19, a conveyance amount of the sheet Sb in contact with the driven roller 113b is smaller than a conveyance amount of the sheet Sa in contact with the drive roller 113a. That is, a deviation (Δd) is generated in the amount of conveyance between the two sheets of the lamination sheet S.

Next, as illustrated in FIG. 21, the lamination sheet S in which the amount of conveyance differs between the two sheets is conveyed in reverse in the direction B and is gripped by the gripper 110.

As illustrated in FIG. 22, the controller 500 of the sheet processing device 100 causes the winding roller 109 to rotate in the counterclockwise direction in FIG. 22 so as to wind the lamination sheet S around the winding roller 109. Then, the sheet Sa as an inner circumferential sheet is left to be wound in a greater amount than the outer circumferential sheet due to the winding circumferential length difference of the two-ply sheet and the generated deviation of the two-ply sheet (see FIG. 20). The loosed amount of the sheet Sa as an inner circumferential sheet is even larger than the loosed amount of the inner circumferential sheet illustrated in FIG. 7, allowing the separation claw 116 to be reliably and stably inserted into a space g between the two sheets of the two-ply sheet.

Figure 23:
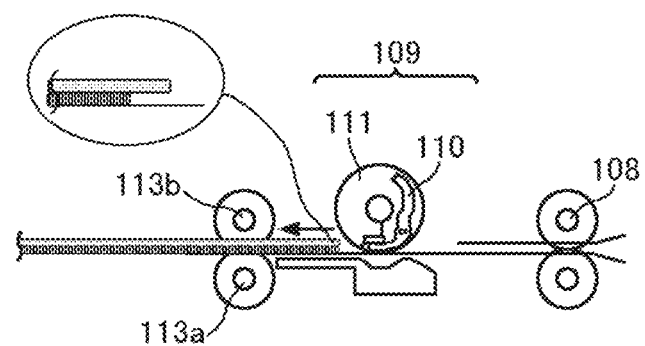
FIG. 23 is a view of the main part of the sheet processing device in which a deviation is generated in the two-ply sheet after the two-ply sheet is released from the winding roller, subsequent to the state in FIG. 22.

If the drive roller 113a and the winding roller 109 are disposed on the opposite sides of the conveyance passage of the lamination sheet S and the driven roller 113b and the winding roller 109 are disposed on the same side of the conveyance passage (see FIG. 23), a greater conveyance amount of the sheet Sb in contact with the driven roller 113b than the conveyance amount of the sheet Sa in contact with the drive roller 113a decreases the winding circumferential length difference and the loosed amount of the sheet Sa.

Next, a description is given below of an advantageous configuration of a sheet processing device.

When the controller 500 causes the winding roller 109 to wind the lamination sheet S, that is, when the controller 500 causes the gripper 110 to grip the lamination sheet S and then causes the winding roller 109 to rotate, the drive roller 113a is preferably rotated in the same direction as the direction in which the winding roller 109 is rotated. The peripheral speed of the drive roller 113a is preferably equal to the peripheral speed of the winding roller 109 or higher, and more preferably higher than the peripheral speed of the winding roller 109.

As a result, the sheet Sa in contact with the drive roller 113a is conveyed between the drive roller 113a and the winding roller 109 in a greater amount than the sheet Sb, thus further loosing the sheet Sa of the lamination sheet S.

However, as a caution, depending on the peripheral speed of the drive roller 113a and the size of the lamination sheet S, the leading end of the lamination sheet S may come off from the drive roller 113a (i.e., the exit roller pair 113) due to an over-conveyance, resulting in a release of the space formed between the drive roller 113a and the winding roller 109. To prevent such a situation, it is desirable that the peripheral speed of the drive roller 113a is determined according to the size of the lamination sheet S.

Alternatively, or in addition, when the lamination sheet S is wound around the winding roller 109, a load torque may be applied to the driven roller 113b to further reduce the conveyance amount of the sheet Sb in contact with the driven roller 113b. A further deviation (difference) is generated in the amount of conveyance between the two sheets of the lamination sheet S.

The configuration in which the load torque is applied to the driven roller 113b is implemented, for example, by providing the driven roller 113b with an electromagnetic one-way clutch or an electromagnetic brake. When the controller 500 causes the winding roller 109 to start winding the lamination sheet S, operating the one-way clutch or the brake timely reduces the conveying force of the driven roller 113b.

Next, a description is given of an operation of inserting the inner sheet P into the separated sheets of the lamination sheet S.

Figure 10:
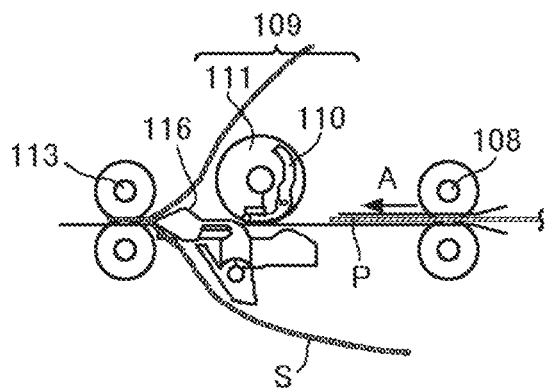
FIG. 10 is a view of the main part of the sheet processing device conveying an inner sheet toward the lamination sheet, subsequent to the state in FIG. 9.

As illustrated in FIG. 10, the controller 500 of the sheet processing device 100 causes the entrance roller pair 108 to rotate and convey the inner sheet P conveyed from the sheet feed tray 103 (see FIG. 1) toward the exit roller pair 113 in the forward conveyance direction (i.e., the direction A).

Figure 11:
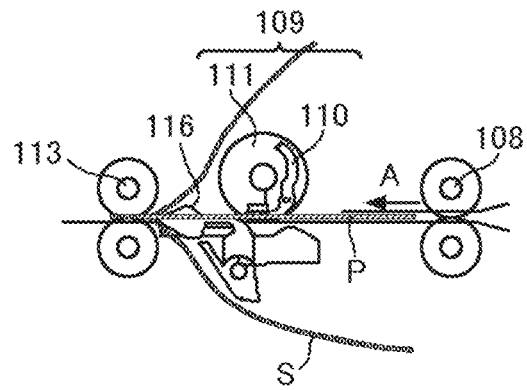
FIG. 11 is a view of the main part of the sheet processing device in which the inner sheet is inserted into the lamination sheet, subsequent to the state in FIG. 10.

Subsequently, as illustrated in FIG. 11, the controller 500 of the sheet processing device 100 causes the exit roller pair 113 to rotate so that the lamination sheet S and the inner sheet P meet, to insert the inner sheet P into the opening of the lamination sheet S.

Figure 12A:
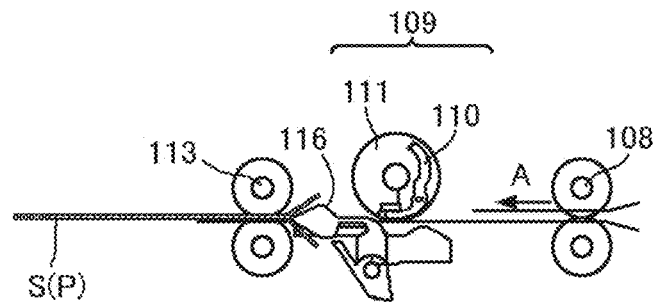
FIG. 12A is a view of the main part of the sheet processing device conveying the lamination sheet inserted in the inner sheet, subsequent to the state in FIG. 11.

Then, as illustrated in FIG. 12A, the controller 500 of the sheet processing device 100 causes the exit roller pair 113 to convey the lamination sheet S in which the inner sheet P is inserted in the forward conveyance direction (i.e., the direction A). Thus, the two sheets of the lamination sheet S are overlapped one on another again so as to close the opening of the lamination sheet S. The controller 500 of the sheet processing device 100 causes the exit roller pair 113 or a roller pair disposed downstream from the exit roller pair 113 in the forward conveyance direction to eject and load the lamination sheet S sandwiching the inner sheet P onto the sheet ejection tray 104 (see FIG. 1).

Figure 12B:
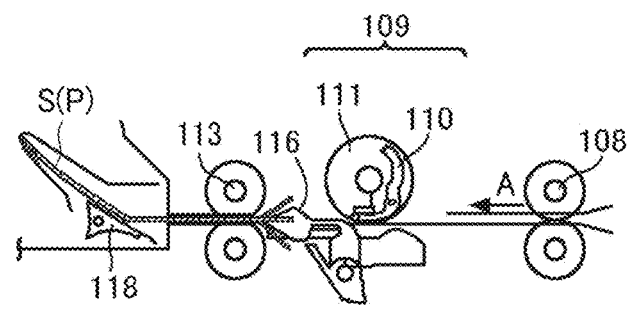
FIG. 12B is a view of the main part of the sheet processing device conveying the lamination sheet inserted in the inner sheet toward a heat pressing device, subsequent to the state in FIG. 11.

As an alternative example, in a case in which a sheet processing device 100 includes a heat pressing device capable of heating and pressing the lamination sheet S, as illustrated in FIG. 12B, a branching claw 118 may switch the sheet conveyance passages of the lamination sheet S to convey the lamination sheet S to the heat pressing device.

As described above, the controller 500 of the sheet processing device 100 according to the present embodiment causes the separation claw 116 to open the lamination sheet S so that the inner sheet S is inserted in and sandwiched between the two sheets of the lamination sheet S. Since the configuration of the sheet processing device 100 is simpler than the configuration of a typical laminating device employing a vacuum device, the entire sheet processing device has a simpler and smaller configuration.

As illustrated in FIG. 1, the sheet processing device 100 according to the present embodiment loads the lamination sheet S and the inner sheet P on separate trays and conveys the lamination sheet S and the inner sheet P separately. Accordingly, the convenience is enhanced without loading the lamination sheet S and the inner sheet P in a predetermined order. Note that, in the present embodiment, the lamination sheets S are loaded on the sheet tray 102, and the inner sheets P are loaded on the sheet feed tray 103. However, the tray on which the lamination sheet S is loaded and the tray on which the inner sheet P is loaded are not limited to the above-described trays. For example, the inner sheet P may be loaded on the sheet tray 102, and the lamination sheet S may be loaded on the sheet feed tray 103.

Modifications

Figure 24A:
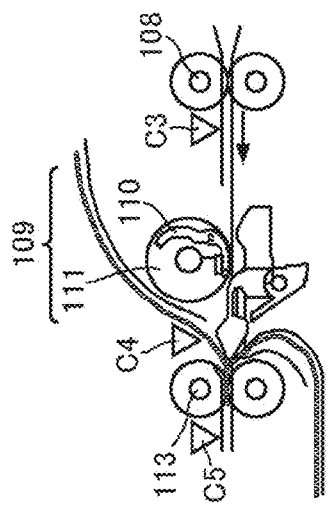
FIG. 24A is a schematic view of a sheet guide passage of two sheets separated from the lamination sheet according to a modification.
Figure 24B:
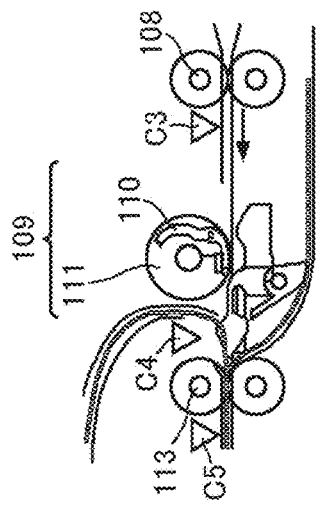
FIG. 24B is a schematic view of the sheet guide passage extending in different directions in an inverted S shape to guide upper and lower sheets in opposite directions according to a modification.
Figure 24C:
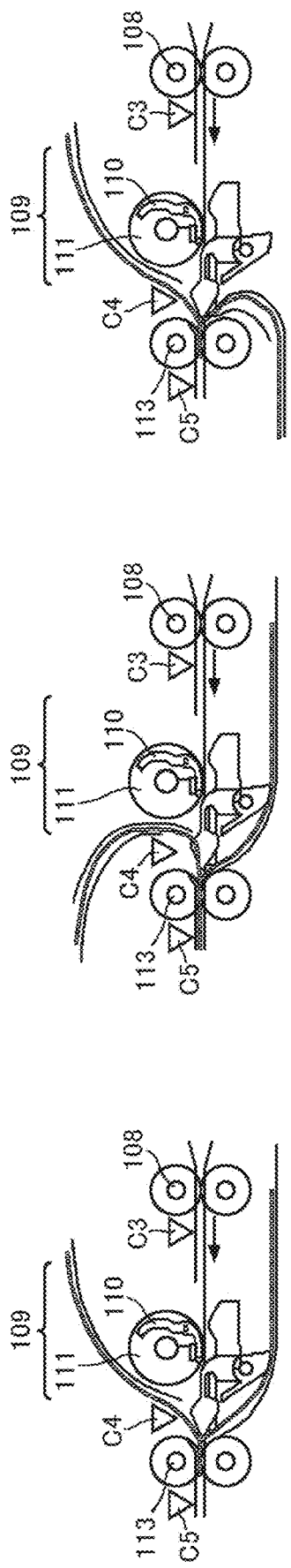
FIG. 24C is a schematic view of the sheet guide passage extending in different directions in an S shape to guide the upper and lower sheets in opposite directions according to another modification.

A description is given of some examples of sheet guide passages of the two separated sheets of the lamination sheet S, with reference to FIGS. 24A, 24B, and 24C. FIGS. 24A, 24B, and 24C are schematic views of sheet guide passages of the two separated sheets of the lamination sheet S according to some modifications. The sheet processing device 100 illustrated in FIG. 24A has the same sheet guide passages as the sheet processing device 100 illustrated in FIG. 9 to guide the upper and lower sheets in the same direction from the bonded portion of the lamination sheet S. Alternatively, as illustrated in FIG. 24B, the sheet processing device 100 may have sheet guide passages extending in different directions in an inverted S shape to guide the upper and lower sheets in opposite directions. Further, as illustrated in FIG. 24C, the sheet processing device 100 may have sheet guide passages extending in different directions in an S shape to guide the upper and lower sheets in opposite directions.

Next, a description is given of a laminating device, an image forming apparatus, and an image forming system, each including a sheet processing device according to an embodiment of the present disclosure.

Figure 25:
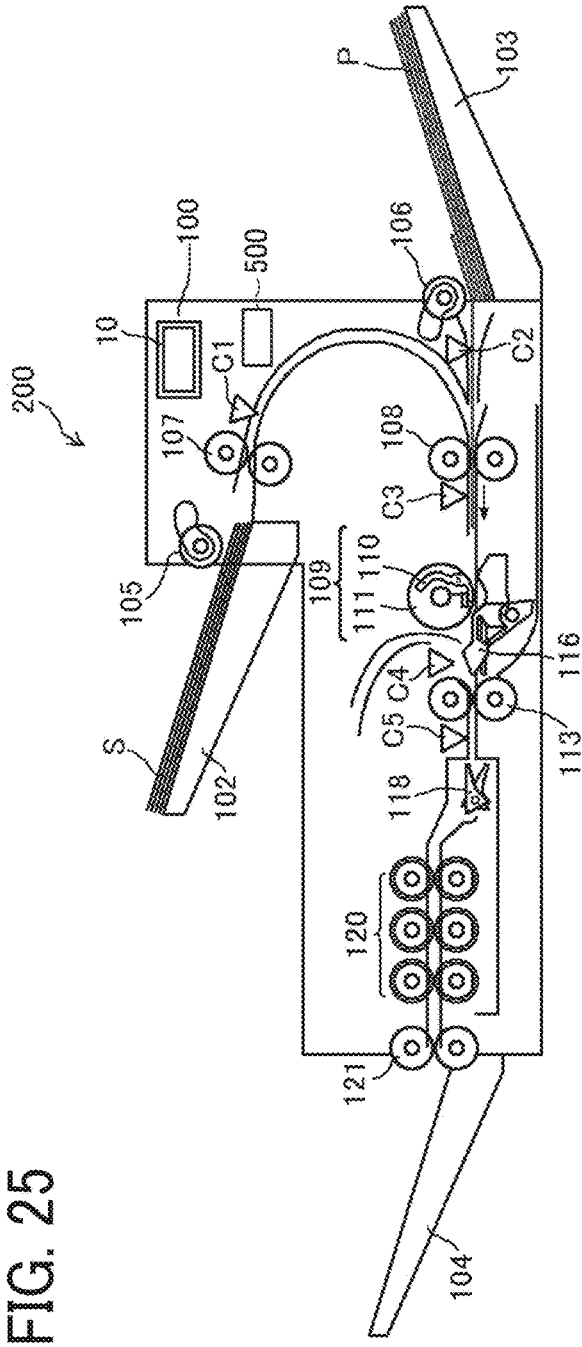
FIG. 25 is a schematic diagram illustrating an overall configuration of a laminating device according to one embodiment of the present disclosure, including the sheet processing device illustrated in FIG. 1.

FIG. 25 is a schematic diagram illustrating an overall configuration of a laminating device including a sheet processing device, according to an embodiment of the present disclosure. As illustrated in FIG. 29, a laminating device 200 includes the sheet processing device 100 described above, the branching claw 118 to switch the sheet conveyance passages of the lamination sheet S, heat pressing rollers 120 as heat pressing members to heat and press the lamination sheet S, and an ejection roller pair 121 disposed downstream from the heat pressing rollers 120 in the sheet conveyance direction.

The laminating device 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations can be performed automatically without human intervention, and convenience can be improved compared to the related art.

Figure 26:
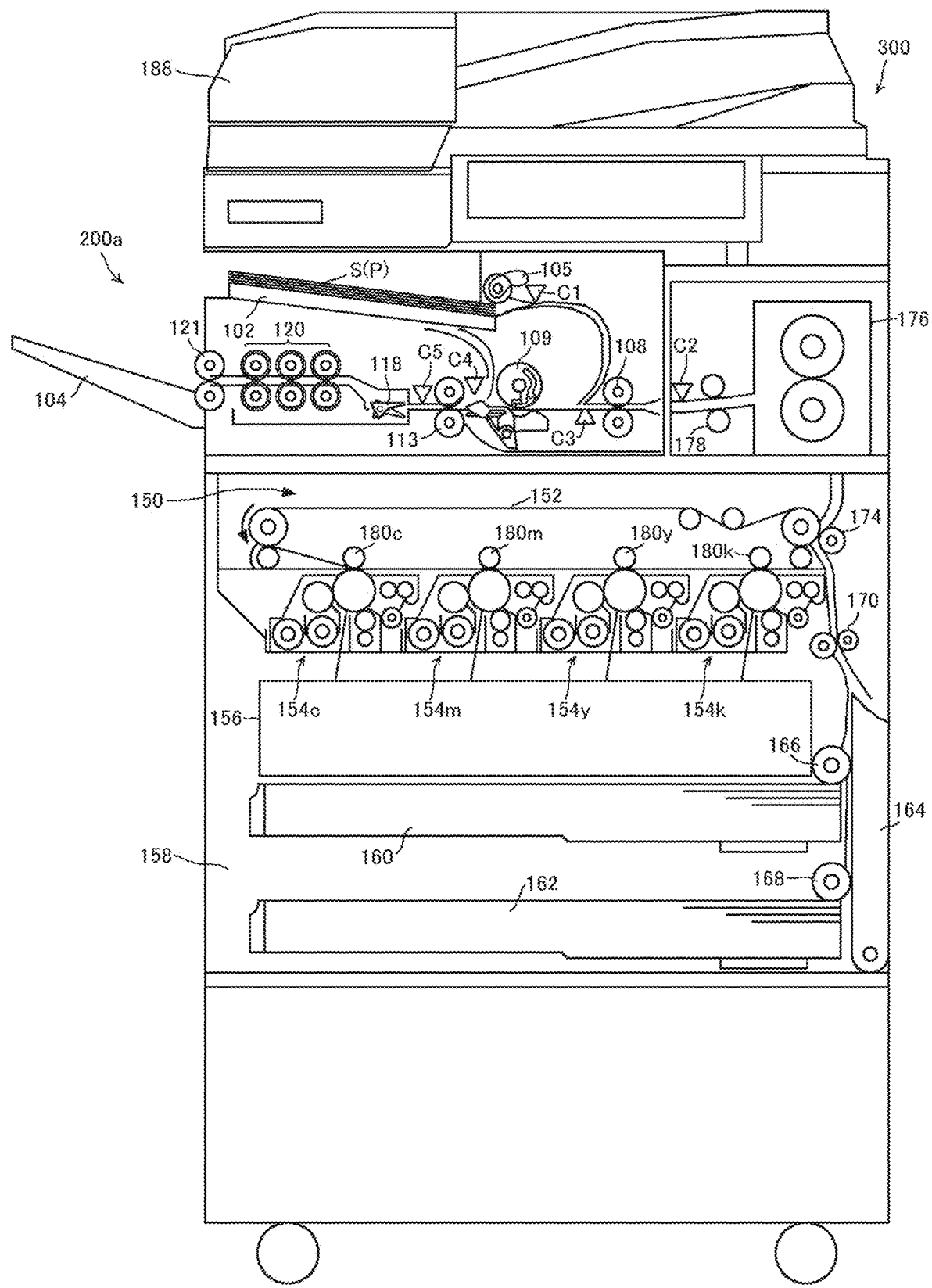
FIG. 26 is a schematic diagram illustrating an overall configuration of an image forming apparatus according to one embodiment of the present disclosure, including the laminating device illustrated in FIG. 25.

FIG. 26 is a schematic diagram illustrating an overall configuration of an image forming apparatus including a laminating device, according to an embodiment of the present disclosure. An image forming apparatus 300 according to the present embodiment includes a laminating device 200a as a device that performs the sheet lamination inside the image forming apparatus 300.

The laminating device 200a includes the sheet tray 102 on which the lamination sheet S or the inner sheet P is loaded. The laminating device 200a is capable of receiving the lamination sheet S, the inner sheet P, or both from the image forming apparatus 300. Accordingly, the image forming apparatus 300 (e.g., a printer or a copier) is capable of adding (forming) an image on the lamination sheet S or the inner sheet P by the in-line connection.

The configuration of a main body of the image forming apparatus 300 is described in detail. As illustrated in FIG. 26, an intermediate transfer device 150 is disposed in the main body of the image forming apparatus 300. The intermediate transfer device 150 includes an endless intermediate transfer belt 152 wound around a plurality of rollers and stretched almost horizontally. The intermediate transfer belt 152 rotates counterclockwise in FIG. 26.

The image forming apparatus 300 further includes image forming devices 154c, 154m, 154y, and 154k for yellow (Y), magenta (M), cyan (C), and black (K), respectively, disposed below the intermediate transfer device 150. The image forming devices 154c, 154m, 154y, and 154k are arranged in a quadruple tandem manner along an extended direction of the intermediate transfer belt 152 in which the intermediate transfer belt 152 is stretched. Each of the image forming devices 154c, 154m, 154y, and 154k includes a drum-shaped image bearer that rotates in the clockwise direction in FIG. 26. Various image forming components such as a charging device, a developing device, a transfer device, and a cleaning device are disposed around each of the image forming devices 154c, 154m, 154y, and 154k. An exposure device 156 is disposed below the image forming devices 154c, 154m, 154y, and 154k in the main body of the image forming apparatus 300.

A sheet feeder 158 is disposed below the exposure device 156 in the main body of the image forming apparatus 300. The sheet feeder 158 includes a first sheet tray 160 that stores lamination sheets S and a second sheet tray 162 that stores the inner sheets P. Note that the first sheet tray 160 serves as a third loader on which a two-ply sheet such as the lamination sheet S is loaded. Similarly, the second sheet tray 162 serves as a fourth loader on which a sheet-shaped medium (e.g., the inner sheet P) is loaded.

A first feed roller 166 is disposed at a position upper right of the first sheet tray 160. The first feed roller 166 feeds out the lamination sheet S one by one from the first sheet tray 160 to a sheet conveyance passage 164. A second feed roller 168 is disposed at a position upper right of the second sheet tray 162. The second feed roller 168 feeds out the inner sheet P one by one from the second sheet tray 162 to the sheet conveyance passage 164.

The sheet conveyance passage 164 extends upwardly on the right side in the main body of the image forming apparatus 300 and communicates with the laminating device 200a disposed in the main body of the image forming apparatus 300. The sheet conveyance passage 164 is provided with, e.g., a conveying roller 170, a secondary transfer device 174 disposed facing the intermediate transfer belt 152, a fixing device 176, and a sheet ejection device 178 including an ejection roller pair, serially.

Note that the first feed roller 166, the conveying roller 170, and the sheet conveyance passage 164 are examples of a third feeder to feed the two-ply sheet from the first sheet tray 160 (i.e., the third loader). The second feed roller 168, the conveying roller 170, and the sheet conveyance passage 164 are examples of a fourth feeder to feed the sheet medium from the second sheet tray 162 (i.e., the fourth loader). Further, the intermediate transfer device 150 and the fixing device 176 are examples of an image forming device that forms the image on the two-ply sheet or the sheet-shaped medium.

Next, a description is given of operations of the image forming apparatus 300 according to the present embodiment to form the image on the lamination sheet S and then perform a lamination process on the lamination sheet S.

When forming the image on the lamination sheet S, firstly, an image reading device 188 reads the image on an original document. The exposure device 156 then performs image writing. Thereafter, the image forming devices 154c, 154m, 154y, and 154k form respective color toner images on the respective image bearers. Then, primary transfer devices 180c, 180m, 180y, and 180k sequentially transfer the respective toner images onto the intermediate transfer belt 152, thereby forming a color image on the intermediate transfer belt 152.

On the other hand, the image forming apparatus 300 rotates the first feed roller 166 to feed and convey the lamination sheet S to the sheet conveyance passage 164. Then, the lamination sheet S is conveyed by the conveying roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152, as described above, onto the lamination sheet S.

After the image transfer, the fixing device 176 fixes the image on the lamination sheet S. The sheet ejection device 178 then sends the lamination sheet S to the laminating device 200a.

Further, the image forming apparatus 300 rotates the second feed roller 168 to feed the inner sheet P to the sheet conveyance passage 164. The sheet ejection device 178 ejects the inner sheet P to the laminating device 200a.

As described above, the lamination sheet S on which the image has been formed and the inner sheet P are conveyed to the laminating device 200a, so that the lamination process is performed in the laminating device 200a. Since the details of the lamination process have been described above, the redundant descriptions are omitted.

According to the above-described configuration of the image forming apparatus 300 according to the present embodiment, the laminating device 200a may perform the lamination process after the image is formed on the inner sheet P. Alternatively, the laminating device 200a may perform the lamination process after the image forming operation has been performed on the inner sheet P and the lamination sheet S.

Next, a description is given of an image forming apparatus including a sheet processing device according to a modification and an image forming system including a sheet processing device according to an embodiment of the present disclosure.

Figure 27:
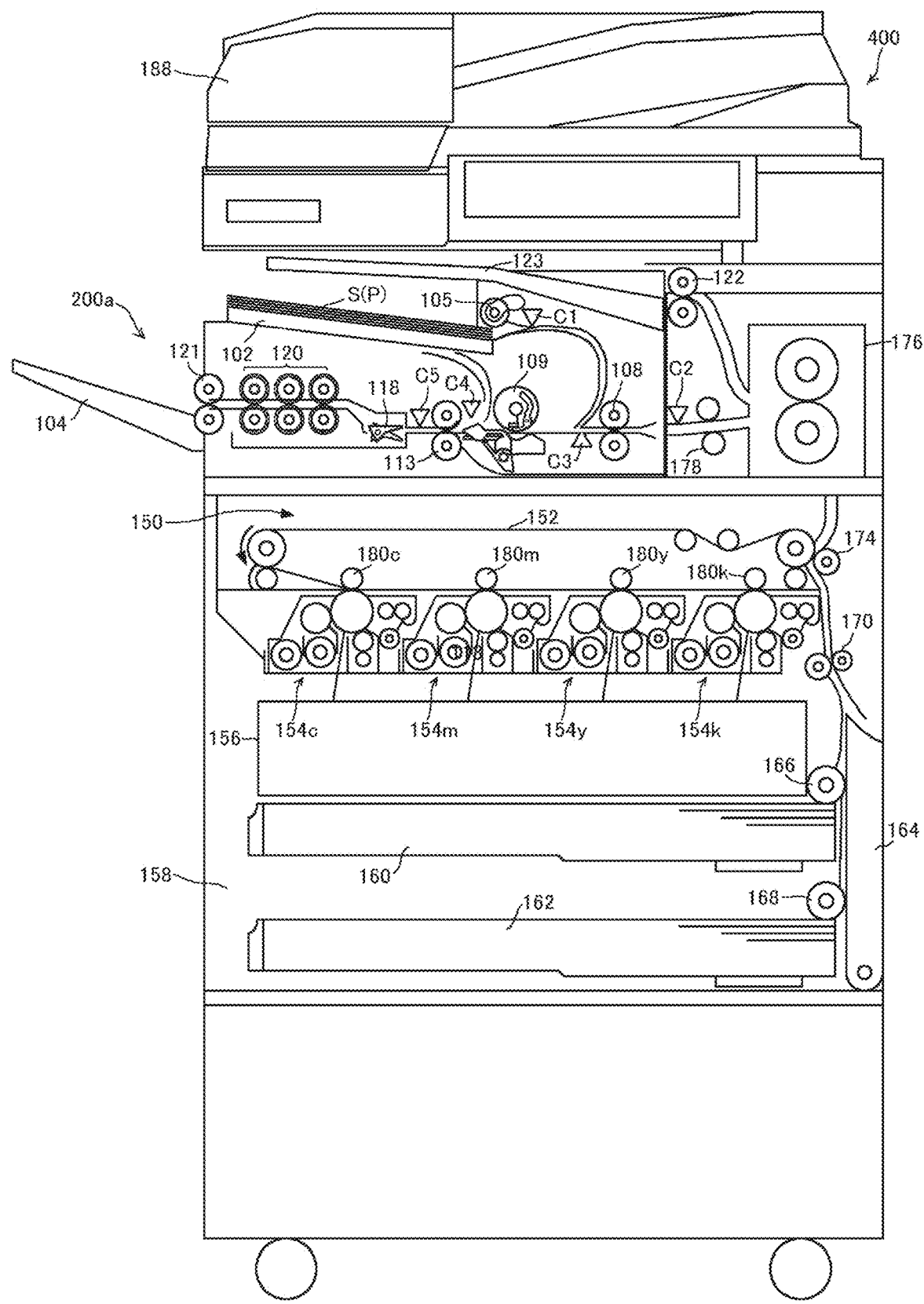
FIG. 27 is a schematic diagram illustrating an overall configuration of an image forming apparatus according to a modification, including the laminating device illustrated in FIG. 25.

FIG. 27 is a schematic diagram illustrating an overall configuration of an image forming apparatus including a laminating device, according to a modification of an embodiment of the present disclosure. An image forming apparatus 400 illustrated in FIG. 27 is basically the same as the image forming apparatus 300 illustrated in FIG. 26. However, different from the image forming apparatus 300 illustrated in FIG. 26, the image forming apparatus 400 includes an ejection roller pair 122 and an ejection tray 123, each of which is disposed in a main body of the image forming apparatus 400.

When the lamination process is not performed, the image forming apparatus 400 can eject the recording medium on which the image is formed using the ejection roller pair 122 to the ejection tray 123. Accordingly, the image forming apparatus 400 does not decrease the image output speed when the lamination process is not performed.

Note that the image forming apparatus 400 may include the laminating device 200a such that the laminating device 200a is detachably attached to the main body of the image forming apparatus 400. That is, when the lamination process is not required, the laminating device 200a may be detached from the image forming apparatus 400.

In this case, the sheet feed tray 103 on which the inner sheet P is loaded and the pickup roller 106 to feed the inner sheet P from the sheet feed tray 103 may be attached to the laminating device 200a thus removed, so that the laminating device 200a is used as a stand-alone laminator similar to the laminating device 200 illustrated in FIG. 25.

The image forming apparatus 300 illustrated in FIG. 26 and the image forming apparatus 400 illustrated in FIG. 27 may include the sheet processing device 100 instead of a laminator. The image forming apparatus 400 illustrated in FIG. 27 may include the sheet processing device 100 that is removably attached to the image forming apparatus 400.

An image forming system may include the image forming apparatus 300 or 400 and the sheet processing device 100 detachably attached to the image forming apparatus 300 or 400 or the laminating device 200 detachably attached to the image forming apparatus 300 or 400. An image forming system according to another embodiment of the present disclosure may further include, for example, at least one of a sheet feeder (a stacker) or a case binding device. Note that, in a case in which the lamination sheet S passes through the fixing device 176, the lamination sheet S is not bonded at a fixing temperature but is bonded by application of heat higher than the fixing temperature.

Although the image forming apparatuses 300 and 400 employ electrophotography for image formation on the lamination sheet S and the inner sheet P in the description above, the image formation method is not limited thereto. Alternatively, inkjet, stencil printing, or other printing method may be used.

Figures 28, 28A:
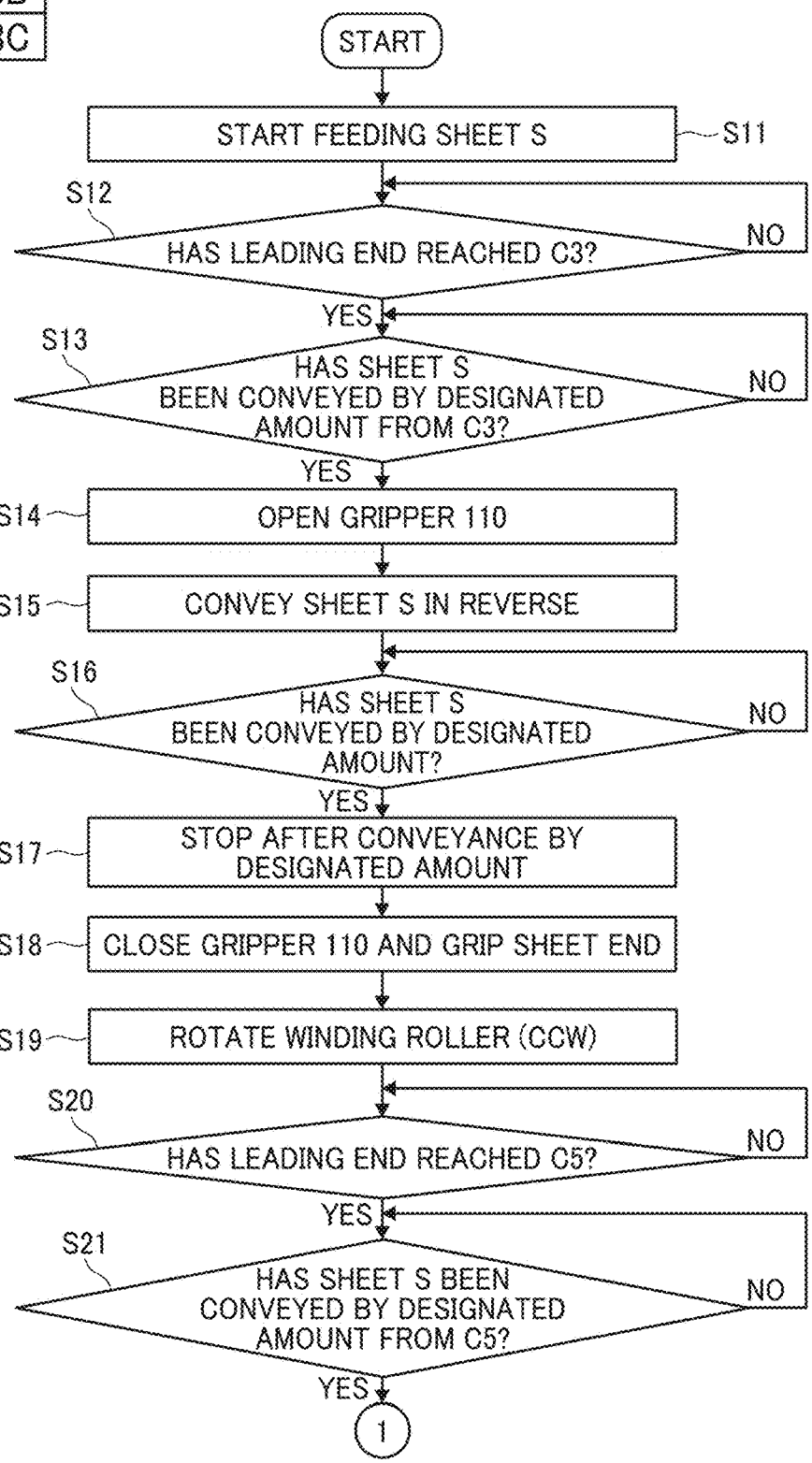
FIG. 28 including
FIGS. 28A, 28B, and 28C is a flowchart illustrating a series of operations of feeding a two-ply sheet, inserting an inner sheet, and laminating the two-ply sheet with the inner sheet being inserted.
Figure 28B:
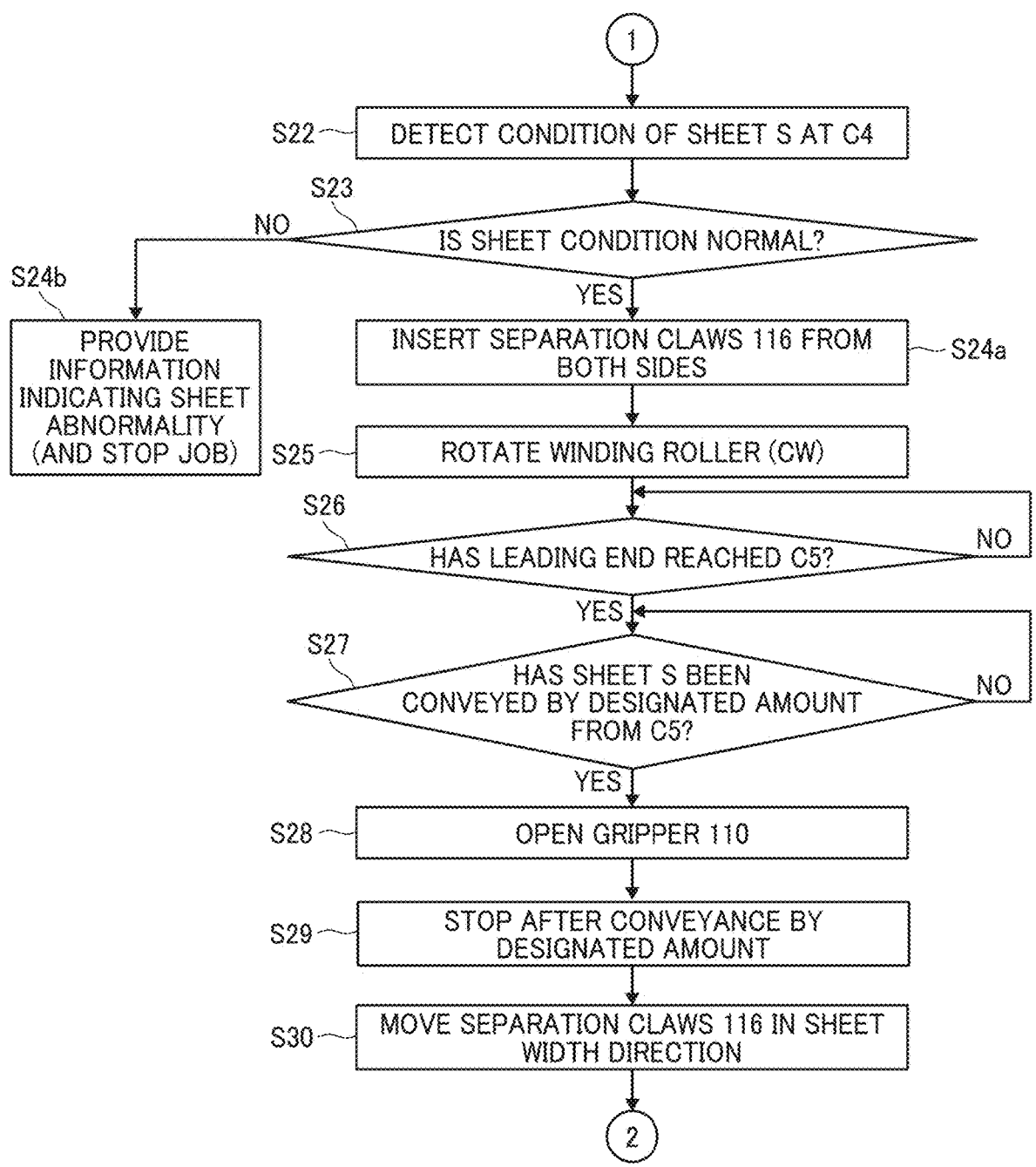
Figure 28C:
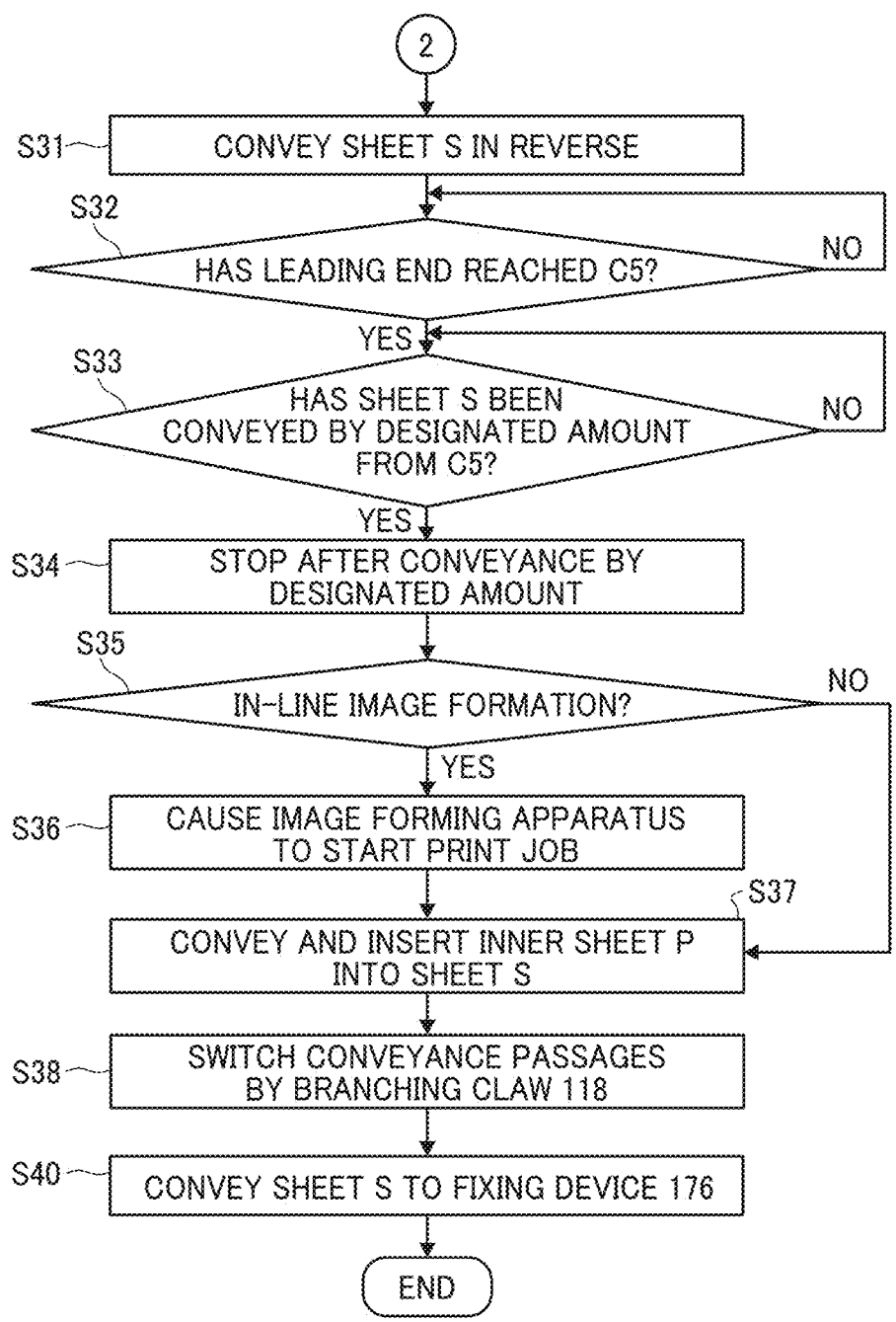

FIG. 28 including FIGS. 28A, 28B, and 28C is a flowchart illustrating a series of operations of feeding a lamination sheet, inserting an inner sheet, and laminating the lamination sheet with the inner sheet being inserted. A description is given below of the series of steps with reference to FIG. 28.

First, in step S11 of FIG. 28, the controller 500 of the sheet processing device 100 causes the pickup roller 105 to start feeding the lamination sheet S (see FIG. 1). In step S12 of FIG. 28, the controller 500 of the sheet processing device 100 determines whether the leading end of the lamination sheet S has reached the conveyance sensor C3 (see FIG. 2) based on the detection result of the conveyance sensor C3. When the leading end of the lamination sheet S has not reached the conveyance sensor C3 (NO in step S12 of FIG. 28), step S12 of FIG. 28 is repeated until the leading end of the lamination sheet S reaches the conveyance sensor C3. By contrast, when the leading end of the lamination sheet S has reached the conveyance sensor C3 (YES in step S12 of FIG. 28), the process goes on to step S13. In step S13 of FIG. 28, the controller 500 of the sheet processing device 100 determines whether the lamination sheet S has been conveyed by a designated amount from the conveyance sensor C3 (see FIG. 3), that is, whether a designated time has passed since the conveyance sensor C3 detects the leading end of the lamination sheet S. When the lamination sheet S has not been conveyed by the designated amount from the conveyance sensor C3 (NO in step S13 of FIG. 28), step S13 of FIG. 28 is repeated until the lamination sheet S is conveyed by the designated amount from the conveyance sensor C3. By contrast, when the lamination sheet S has been conveyed by the designated amount from the conveyance sensor C3 (YES in step S13 of FIG. 28), the controller 500 of the sheet processing device 100 causes the exit roller pair 113 to stop conveying the lamination sheet S temporarily (see FIG. 3).

In step S13, since the conveyance amount of the sheet Sb in contact with the driven roller 113b is smaller than the conveyance amount of the sheet Sa in contact with the drive roller 113a, a deviation (Δd) is generated in the conveyance amount between the two sheets of the lamination sheet S (see FIG. 20).

Subsequently, in step S14 of FIG. 28, the controller 500 of the sheet processing device 100 causes the gripper 110 to open. Then, in step S15 of FIG. 28, the controller 500 of the sheet processing device 100 causes the exit roller pair 113 to convey the lamination sheet S in the reverse conveyance direction (see FIG. 4).

In step S16 of FIG. 28, the controller 500 of the sheet processing device 100 determines whether the lamination sheet S has been conveyed by a designated amount. When the lamination sheet S has not been conveyed by the designated amount (NO in step S16 of FIG. 28), step S16 of FIG. 28 is repeated until the lamination sheet S is conveyed by the designated amount. By contrast, when the lamination sheet S has been conveyed by the designated amount (YES in step S16 of FIG. 28), in step S17 of FIG. 28, the controller 500 of the sheet processing device 100 causes the exit roller pair 113 to stop conveying the lamination sheet S temporarily. In step S18 of FIG. 28, the controller 500 of the sheet processing device 100 causes the gripper 110 to close and grip the trailing end of the lamination sheet S (see FIG. 21).

In step S19 of FIG. 28, the controller 500 of the sheet processing device 100 causes the winding roller 109 to rotate in the counterclockwise direction (i.e., in the reverse direction) and wind the lamination sheet S around the winding roller 109 (see FIG. 6).

In step S19, the winding circumferential length difference between the two sheets of the two-ply sheet and the generated deviation of the lamination sheet S (see FIG. 20) causes a greater surplus of the sheet Sa as an inner circumferential sheet of the two-ply sheet than the surplus of the sheet Sa caused by the winding circumferential length difference alone. As a result, a space even larger than the related art is formed between the two sheets.

In step S20 of FIG. 28, the controller 500 of the sheet processing device 100 determines whether the leading end of the lamination sheet S has reached the conveyance sensor C5. When the leading end of the lamination sheet S has not reached the conveyance sensor C5 (NO in step S20 of FIG. 28), step S20 of FIG. 28 is repeated until the leading end of the lamination sheet S reaches the conveyance sensor C5. By contrast, when the leading end of sheet S has reached the conveyance sensor C5 (YES in step S20 of FIG. 28), the process goes on to step S21 of FIG. 28. In step S21 of FIG. 28, the controller 500 of the sheet processing device 100 determines whether the lamination sheet S has been conveyed by a designated amount from the conveyance sensor C5. When the lamination sheet S has not been conveyed by the designated amount from the conveyance sensor C5 (NO in step S21 of FIG. 28), step S21 of FIG. 28 is repeated until the lamination sheet S is conveyed by the designated amount from the conveyance sensor C5. By contrast, when the lamination sheet S has been conveyed by the designated amount from the conveyance sensor C5 (YES in step S21 of FIG. 28), in step S22 of FIG. 22, the controller 500 causes the abnormality detection sensor C4 to detect the condition of the lamination sheet S. Then, in step S23 of FIG. 28, the controller 500 determines whether the condition of the lamination sheet S is normal based on the detection results of the abnormality detection sensor C4.

The abnormality detection sensor C4 is an abnormality detector to detect the size of the space between the two sheets of the lamination sheet S so that the controller 500 of the sheet processing device 100 determines whether the size of the space exceeds a predetermined threshold value. In step S23 of FIG. 28, the controller 500 of the sheet processing device 100 determines whether the condition of the lamination sheet S is normal, that is, whether the size of the space between the two sheets of the lamination sheet S is equal to or greater than the predetermined threshold value, based on the detection result of the abnormality detection sensor C4. When the condition of the lamination sheet S is normal (YES in step S23 of FIG. 28), the process goes on to step S24a of FIG. 28.

By contrast, when the controller 500 of the sheet processing device 100 determines that the condition of the lamination sheet S is abnormal, in other words, when the controller 500 of the sheet processing device 100 determines that the size of the space is smaller than the predetermined threshold value (NO in step S23 of FIG. 28), in step S24b of FIG. 28, the controller 500 of the sheet processing device 100 provides information indicating the abnormality. For example, the controller 500 of the sheet processing device 100 causes the operation panel 10 to display the abnormality (e.g., displays an error message) and stops the series of operations of sheet processing job.

In step S24a of FIG. 28, the controller 500 of the sheet processing device 100 causes the separation claws 116 to be inserted from the opposed sides of the lamination sheet S into the space formed between the sheets of the lamination sheet S (see FIG. 7). As described in step S19, since a relatively large space is formed between the two sheets of the lamination sheet S, the separation claw 116 is stably inserted into the space.

In step S25 of FIG. 28, the controller 500 of the sheet processing device 100 causes the winding roller 109 to rotate in the clockwise direction (i.e., in the forward direction) with the separation claws 116 inserted into the space from the opposed sides of the lamination sheet S and convey the lamination sheet S in the forward conveyance direction.

Then, in step S26 of FIG. 28, the controller 500 of the sheet processing device 100 determines whether the leading end of the lamination sheet S has reached the conveyance sensor C5. When the leading end of the lamination sheet S has not reached the conveyance sensor C5 (NO in step S26 of FIG. 28), step S26 of FIG. 28 is repeated until the leading end of the lamination sheet S reaches the conveyance sensor C5. By contrast, when the leading end of sheet S has reached the conveyance sensor C5 (YES in step S26 of FIG. 28), the process goes on to step S27 of FIG. 28. In step S27 of FIG. 28, the controller 500 of the sheet processing device 100 determines whether the lamination sheet S has been conveyed by a designated amount from the conveyance sensor C5. When the lamination sheet S has not been conveyed by the designated amount from the conveyance sensor C5 (NO in step S27 of FIG. 28), step S27 of FIG. 28 is repeated until the lamination sheet S is conveyed by the designated amount from the conveyance sensor C5. By contrast, when the lamination sheet S has been conveyed by the designated amount from the conveyance sensor C5 (Yes in step S27 of FIG. 28), in step S28 of FIG. 28, the controller 500 of the sheet processing device 100 causes the gripper 110 to open.

Then, in step S29 of FIG. 28, the controller 500 of the sheet processing device 100 causes the exit roller pair 113 to stop conveying the lamination sheet S temporarily after the lamination sheet S has been conveyed by the designated amount. Then, in step S30 of FIG. 28, the controller 500 causes the separation claws 116 to move further in a sheet width direction, which is the width direction of the lamination sheet S (see FIGS. 8 and 17). As a result, the lamination sheet S is separated into the upper and lower sheets at the trailing end in the forward conveyance direction.

In step S31 of FIG. 28, the controller 500 of the sheet processing device 100 causes the exit roller pair 113 to convey the lamination sheet S in the reverse conveyance direction. In step S32 of FIG. 28, the controller 500 determines whether the leading end of the lamination sheet S in the forward conveyance direction has reached the conveyance sensor C5. When the leading end of the lamination sheet S has not reached the conveyance sensor C5 (NO in step S32 of FIG. 28), step S32 of FIG. 28 is repeated until the leading end of the lamination sheet S reaches the conveyance sensor C5. By contrast, when the leading end of sheet S has reached the conveyance sensor C5 (YES in step S32 of FIG. 28), the process goes on to step S33 of FIG. 28. In step S33 of FIG. 28, the controller 500 of the sheet processing device 100 determines whether the lamination sheet S has been conveyed by a designated amount from the sheet sensor C5 (see FIGS. 3 and 9). When the lamination sheet S has not been conveyed by the designated amount from the sheet sensor C5 (NO in step S33 of FIG. 28), step S33 of FIG. 28 is repeated until the lamination sheet S is conveyed by the designated amount from the sheet sensor C5. By contrast, when the lamination sheet S has been conveyed by the designated amount from the sheet sensor C5 (YES in step S33 of FIG. 28), in step S34 of FIG. 28, the controller 500 causes the exit roller pair 113 to stop conveying the lamination sheet S temporarily (see FIGS. 3 and 9). As a result, the separation of the lamination sheet S is completed.

Subsequently, in step S35 of FIG. 28, the controller 500 of the sheet processing device 100 determines whether to perform an image forming operation with an in-line image forming apparatus on the inner sheet P to be inserted into the lamination sheet S. When the image forming operation is performed with the in-line image forming apparatus (YES in step S35 of FIG. 28), in step S36 of FIG. 28, the controller 500 of the sheet processing device 100 sends a signal to cause the in-line image forming apparatus to start the print job (i.e., the printing operation) to form an image on the inner sheet P. Then, the process goes on to step S37 of FIG. 28.

By contrast, when the image forming operation is not performed with the in-line image forming apparatus (NO in step S35 of FIG. 28), the process goes on to step S37 of FIG. 28.

In step S37 of FIG. 28, the controller 500 of the sheet processing device 100 causes the entrance roller pair 108 to convey the inner sheet P in the forward conveyance direction to insert the inner sheet P into the opening of the lamination sheet S (see FIGS. 10 and 11).

Then, in step S38 of FIG. 28, the controller 500 of the sheet processing device 100 causes the branching claw 118 to switch the sheet conveyance passages of the lamination sheet S. In step S39 of FIG. 28, the controller 500 of the sheet processing device 100 causes the exit roller pair 113 to convey the lamination sheet S sandwiching the inner sheet P to the heat pressing device (e.g., fixing device 176), and heat and pressure are applied to complete the lamination process (see FIG. 12B).

In the case of in-line image formation (Yes in step S35 of FIG. 28), the controller 500 of the sheet processing device 100 causes the image forming apparatus to start the print job after the sheet processing device 100 completes separating the lamination sheet S. The image forming apparatus prints an image on the inner sheet P and conveys the inner sheet P to the sheet processing device 100. In this case, the sheet processing device 100 waits until the printed inner sheet P is conveyed and reaches the conveyance sensor C1. The controller 500 of the sheet processing device 100 may send the image forming apparatus the signal to start the print job in advance based on a time to convey the printed inner sheet P, for example, after the separation claws 116 completes the operation illustrated in FIG. 7. Such a configuration enhances the productivity.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. For example, embodiments and variations may be combined with each other. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A sheet processing device comprising:
a conveyor configured to convey a sheet-shaped medium into a two-ply sheet in which two sheets are overlaid and partially bonded, the conveyor including:
a drive roller configured to drive rotationally; and
a driven roller configured to be driven by the drive roller;
a rotator configured to wind the two-ply sheet;
a separation plate configured to separate the two sheets of the two-ply sheet; and
control circuitry configured to:
cause the conveyor to convey the two-ply sheet in a winding direction to wind the two-ply sheet around the rotator to generate a space between the two sheets of the two-ply sheet; and
cause the separation plate to insert into the space between the two sheets of the two-ply sheet to separate the two sheets of the two-ply sheet,
wherein the drive roller and the rotator are disposed on a same side with respect to a sheet conveyance passage of the two-ply sheet, and
wherein the driven roller and the rotator are disposed on opposite sides with respect to the sheet conveyance passage.

2. The sheet processing device according to claim 1, wherein the control circuitry is configured to cause the drive roller to rotate in a same direction as a direction in which the rotator rotates when the two-ply sheet is wound around the rotator.

3. The sheet processing device according to claim 1, wherein a peripheral speed of the drive roller is equal to or higher than a peripheral speed of the rotator.

4. The sheet processing device according to claim 3, wherein the control circuitry is configured to control the drive roller and the rotator such that the peripheral speed of the drive roller is equal to or higher than the peripheral speed of the rotator.

5. The sheet processing device according to claim 1, wherein a load torque is applied to the driven roller when the two-ply sheet is wound around the rotator.

6. The sheet processing device according to claim 5, further comprising a one-way clutch or an electromagnetic brake configured to apply the load torque to the driven roller.

7. A laminating device comprising:
the sheet processing device according to claim 1; and
a heat pressing member configured to heat and press the two-ply sheet.

8. An image forming apparatus comprising:
an image forming device configured to form an image; and
the laminating device according to claim 7.

9. An image forming system comprising:
an image forming apparatus; and
the laminating device according to claim 7.

10. An image forming system comprising:
an image forming apparatus; and
the laminating device according to claim 7 detachably attached to the image forming apparatus.

11. The laminating device of claim 7, further comprising:
heat pressing rollers configured to heat and press the separated two sheets with a inner sheet between the separated two sheets.

12. The laminating device of claim 11, further comprising:
a first sheet feeding tray; and
a second sheet feeding tray,
wherein the conveyer is configured to convey the two-ply sheet from the first sheet feeding tray and convey the inner sheet from the second sheet feeding tray.

13. An image forming apparatus comprising:
an image forming device configured to form an image; and
the sheet processing device according to claim 1.

14. An image forming system comprising:
an image forming apparatus; and
the sheet processing device according to claim 1.

15. An image forming system comprising:
an image forming apparatus; and
the sheet processing device according to claim 1 detachably attached to the image forming apparatus.

* * * * *